US012586548B2

(12) United States Patent
Lee et al.

(10) Patent No.: US 12,586,548 B2

(45) Date of Patent: Mar. 24, 2026

(54) DISPLAY DEVICE AND METHOD FOR DISPLAYING IMAGE

(71) Applicant: SAMSUNG ELECTRONICS CO., LTD., Suwon-si (KR)

(72) Inventors: Choonghoon Lee, Suwon-si (KR); Minsung Kim, Suwon-si (KR); Sung-Jin Park, Suwon-si (KR); Seung-Hoon Baek, Suwon-si (KR); Jeong Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/420,518

(22) Filed: Jan. 23, 2024

(65) Prior Publication Data

US 2025/0022438 A1 Jan. 16, 2025

(30) Foreign Application Priority Data

Jul. 12, 2023 (KR) ........................ 10-2023-0090663

(51) Int. Cl.
*G09G 5/12* (2006.01)

(52) U.S. Cl.
CPC ....... *G09G 5/12* (2013.01); *G09G 2300/0413* (2013.01); *G09G 2310/0297* (2013.01); *G09G 2320/0276* (2013.01); *G09G 2320/0673* (2013.01); *G09G 2360/16* (2013.01)

(58) Field of Classification Search
CPC ............. G09G 5/12; G09G 2300/0413; G09G 2310/0297; G09G 2320/0276; G09G 2320/0673; G09G 2360/16; G09G 3/3275; H04N 13/106; H04N 13/332
See application file for complete search history.

(56) References Cited

U.S. PATENT DOCUMENTS 7,414,598 B2 * 8/2008 Lee ...................... G09G 3/2059 358/521
8,749,540 B2 6/2014 Lee
8,957,840 B2 * 2/2015 Shin ..................... G09G 3/3607 345/89
9,601,043 B2 3/2017 Hikichi et al.
9,870,747 B2 1/2018 Park et al.
9,952,264 B2 4/2018 Brahma et al.
10,643,529 B1 5/2020 Chien et al.
10,726,775 B2 7/2020 Yoo et al.
(Continued)

FOREIGN PATENT DOCUMENTS

KR 10-2011-0024529 3/2011
TW 202025121 A 7/2020

*Primary Examiner* — Grant Sitta
(74) *Attorney, Agent, or Firm* — Fish & Richardson P.C.

(57) ABSTRACT

A display device includes a first display driver circuit that outputs a first gamma reference voltage to a first display panel, and a second display driver circuit that outputs a second gamma reference voltage to a second display panel different from the first display panel, and determines the difference between the first gamma reference voltage and the second gamma reference voltage, and keeps outputting the second gamma reference voltage when the difference is smaller than a first reference value, and changes the second gamma reference voltage when the second gamma reference voltage is less than the first gamma reference voltage and the difference is equal to or greater than the first reference value.

20 Claims, 13 Drawing Sheets

(56) References Cited

U.S. PATENT DOCUMENTS

| | | | | |
|---|---|---|---|---|
| 11,250,747 | B2 | 2/2022 | Park | |
| 11,373,579 | B2 | 6/2022 | Park | |
| 2009/0303162 | A1 * | 12/2009 | Kohno | G09G 3/3233 345/76 |
| 2012/0299817 | A1 * | 11/2012 | Atkins | G02B 27/0093 345/156 |
| 2013/0147859 | A1 * | 6/2013 | Kobayashi | G09G 5/10 345/690 |
| 2015/0091949 | A1 * | 4/2015 | Kim | G09G 3/3648 345/92 |
| 2015/0348492 | A1 * | 12/2015 | Park | G09G 3/3666 345/205 |
| 2017/0140711 | A1 * | 5/2017 | Zhang | G09G 3/003 |
| 2019/0130844 | A1 * | 5/2019 | Yang | G09G 3/2007 |
| 2022/0076633 | A1 | 3/2022 | Jo et al. | |

* cited by examiner

50

DISPLAY DEVICE AND METHOD FOR DISPLAYING IMAGE

CROSS-REFERENCE TO RELATED APPLICATION

This application claims priority to and the benefit of Korean Patent Application No. 10-2023-0090663 filed in the Korean Intellectual Property Office on Jul. 12, 2023, the entire content of which is incorporated herein by reference.

BACKGROUND

With the development of information and communication technologies, information related to various types of images is being distributed. Therefore, electronic devices such as automobile devices, smart phones, and artificial reality systems include display devices for conveying information on images to users. As the amount of data required to be processed to provide information on images has increased, high-performance display devices have been used.

Display devices may generate and emit light, using various elements. Such display devices may perform various operations in order to improve the qualities of images to be displayed by the display devices.

SUMMARY

The present disclosure generally relates to a display device including two display panels for displaying images with the same quality.

A display device according to some implementations includes a first display driver circuit that outputs a first gamma reference voltage to a first display panel, and a second display driver circuit that outputs a second gamma reference voltage to a second display panel different from the first display panel, and determines the difference between the first gamma reference voltage and the second gamma reference voltage, and keeps outputting the second gamma reference voltage when the difference is smaller than a first reference value, and changes the second gamma reference voltage when the second gamma reference voltage is lower than the first gamma reference voltage and the difference is equal to or greater than the first reference value.

A display device according to some implementations includes a first display panel that emits first image light based on first image data, using a first gamma reference voltage, a second display panel that emits second image light based on second image data, using a second gamma reference voltage, and a processor that generates the first image data and the second image data, and controls the gamma reference voltage of the first display panel or the second display panel, on the basis of the difference between the first gamma reference voltage and the second gamma reference voltage.

An image display method of display panels according to some implementations includes comparing, by a first display panel, a first gamma reference voltage that is used in the first display panel with a second gamma reference voltage that is used in a second display panel, changing the first gamma reference voltage when the first gamma reference voltage is less than the second gamma reference voltage, and instructing the second display panel to change the second gamma reference voltage when the second gamma reference voltage is less than the first gamma reference voltage.

DETAILED DESCRIPTION

Figure 1:
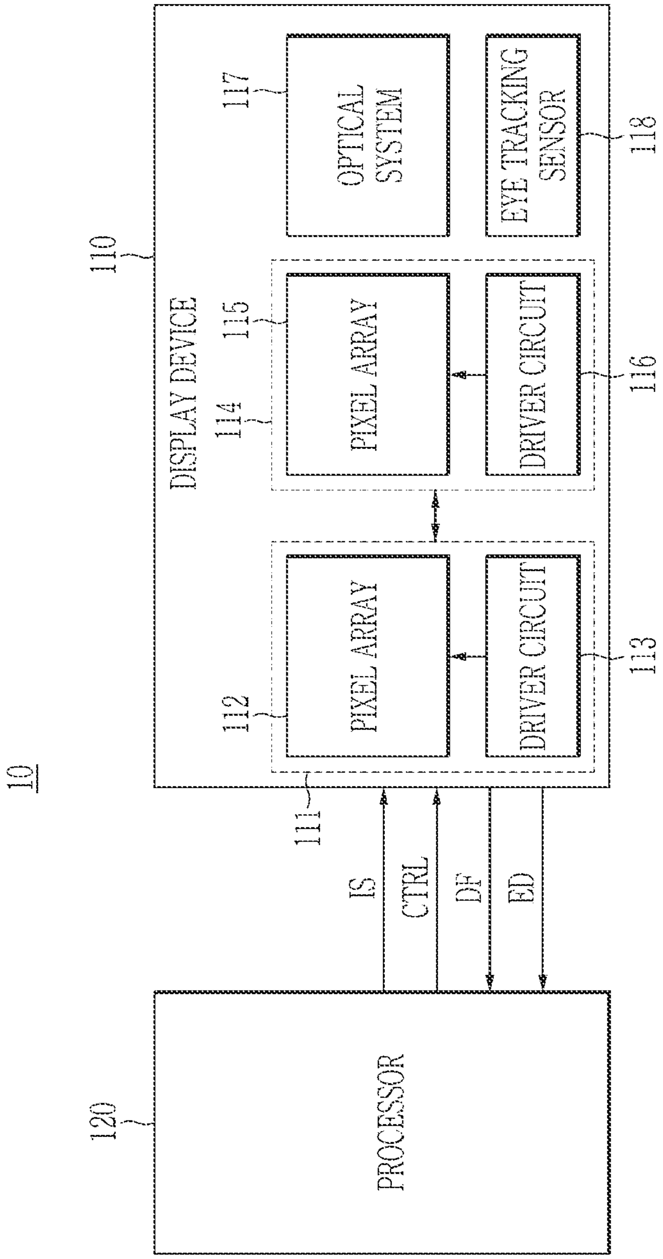
FIG. 1 is a block diagram for explaining a display system according to some implementations.

In the following detailed description, only certain implementations of the present disclosure have been shown and described, simply by way of illustration. As those skilled in the art would realize, the described implementations may be modified in various different ways, all without departing from the spirit or scope of the present disclosure.

Accordingly, the drawings and description are to be regarded as illustrative in nature and not restrictive. Like reference numerals designate like elements throughout the specification. In the flow chart described with reference to the drawings, the order of operations may be changed, several operations may be combined, an operation may be divided, and some operations may not be performed.

Further, expressions written in the singular forms can be comprehended as the singular forms or plural forms unless clear expressions such as “a”, “an”, or “single” are used. Terms including an ordinal number, such as first and second, are used for describing various constituent elements, but the constituent elements are not limited by the terms. The terms are used only to discriminate one constituent element from other constituent elements.

FIG. 1 is a block diagram for explaining a display system according to some implementations.

Referring to FIG. 1, a display system 10 according to some implementations may provide artificial reality systems, such as virtual reality (VR) systems, augmented reality (AR) systems, mixed reality (MR) systems, hybrid reality systems, or combinations of some of them, and/or derivative systems thereof. Artificial reality systems may be implemented on a variety of platforms including head-mounted displays (HMDs), mobile devices, computing systems, or other hardware platforms capable of providing artificial reality contents to one or more viewers.

The display system 10 includes a display device 110 and a processor 120. The processor 120 may be a host device for managing the display device 110. The processor 120 may generate first image data for the left eye of a user, and second image data for the right eye. The processor 120 may transmit the first and second image data as image data IS to the display device 110. Depending on implementation, the first image data and the second image data may be the same, or may be different. The display device 110 may receive the image data IS transmitted from the processor 120, and display images according to the image data IS. The display device 110 may display two-dimensional or three-dimensional images to users.

The display device 110 according to some implementations includes a first display panel 111, a second display panel 114, an optical system 117, and an eye tracking sensor 118. The first display panel 111 and the second display panel 114 may be mounted in the display device 110 so as to be physically separated. For example, in the display device 110, the first display panel 111 may be disposed for the left eye of a user, and the second display panel 114 may be disposed for the right eye of the user. The optical system 117 may optically process image light emitted from the first display panel 111 and the second display panel 114, and output the processed light to the user's eyes. The optical system 117 may reflect, refract, and correct image light. For example, the optical system 117 may include a first optical system that processes image light of the first display panel 111, and a second optical system that processes image light of the second display panel 114. The first and second optical systems may be disposed in the display device 110 so as to be physically separated.

The first and second display panels 111 and 114 may display images to the user according to image data IS received from the processor 120. For example, the first display panel 111 may display images based on first image data of the image data IS, and the second display panel 114 may display images based on second image data of the image data IS. The first display panel 111 may display images to the left eye of a user, and the second display panel 114 may display images to the right eye of the user. Depending on implementation, the first display panel 111 may be implemented to display images to the right eye of a user, and the second display panel 114 may be implemented to display images to the left eye of the user. The first and second display panels 111 and 114 may be implemented with liquid crystal displays (LCDs), organic light-emitting diode (OLED) displays, inorganic light-emitting diode (ILED) displays, micro light-emitting diode (μLED) displays, micro OLED (μOLED) displays, active matrix OLED displays (AMOLEDs), transparent OLED (TOLED) displays, etc. In some implementations, the display device 110 may further include a power supply circuit, such as a DC-to-DC converter, that supplies drive voltages to the first display panel 111, the second display panel 114, the optical system 117, and the eye tracking sensor 118.

The first display panel 111 includes a pixel array 112 and a driver circuit 113. The first display panel 111 may have a backplane structure in which the pixel array 112 and the driver circuit 113 are disposed on a silicon substrate (silicon semiconductor substrate). For example, the first display panel 111 may include a pixel array 112 and a driver circuit 113 on a complementary metal-oxide-semiconductor (CMOS) wafer.

The pixel array 112 may include a plurality of pixels, and a plurality of gate lines and a plurality of source lines coupled to the plurality of pixels, respectively. In some implementations, the plurality of pixels may emit light of predominant colors such as red, green, blue, white, or yellow.

The driver circuit 113 may generate signals to drive the pixel array 112 on the basis of first image data of image data IS received from the processor 120. Signals to drive the pixel array 112 may be transmitted to the plurality of pixels through the plurality of gate lines and the plurality of source lines. In some implementations, the driver circuit 113 may generate data signals and gate signals to drive the plurality of pixels included in the pixel array 112, and provide the data signals and the gate signals to the plurality of pixels. The driver circuit 113 may generate a gamma reference voltage, and generate a plurality of gamma voltages on the basis of the gamma reference voltage. The driver circuit 113 may generate a plurality of data signals on the basis of the plurality of gamma voltages. At this time, the processor 120 may determine whether a first gamma reference voltage which is used by the driver circuit 113 of the first display panel 111 is the same as a second gamma reference voltage which is used by a driver circuit 116 of the second display panel 114, or not. The plurality of pixels included in the pixel array 112 may emit image light based on signals provided by the driver circuit 113.

The second display panel 114 may include constituent elements similar to those in the first display panel 111, and perform an operation similar to that of the first display panel 111. The second display panel 114 includes a pixel array 115 and the driver circuit 116. The contents related to the pixel array 112 and the driver circuit 113 may be applied similarly to the pixel array 115 and the driver circuit 116, so a description of the same contents will not be made.

The first and second display panels 111 and 114 may operate to generate the same gamma reference voltage. The first and second display panels 111 and 114 may monitor gamma reference voltages. For example, the first display panel 111 may generate a first gamma reference voltage and use it, and the second display panel 114 may generate a second gamma reference voltage and use it. The first display panel 111 may receive the second gamma reference voltage from the second display panel 114, and compare the first gamma reference voltage and the second gamma reference voltage. The first display panel 111 may include an analog-to-digital converter (ADC) for comparing the first gamma reference voltage and the second gamma reference voltage. In this case, the first display panel 111 that compares the gamma reference voltages may be referred to as the master panel, and the second display panel 114 that transmits its own gamma reference voltage to another display panel (i.e., the first display panel 111) may be referred to as the slave panel. The master panel and the slave panel may be determined in advance, or may be designated by the processor 120. In some implementations, the processor 120 may change the master panel and the slave panel even while the first and second display panels 111 and 114 emit image light. In some implementations, the processor 120 may monitor the first and second gamma reference voltages of the first and second display panels 111 and 114, and set a display panel that generates a higher gamma reference voltage, as the master panel.

The first display panel 111 may keep generating the first gamma reference voltage when the first and second gamma reference voltages are the same or the difference between the first and second gamma reference voltages is smaller than a first reference value. Similarly, the second display panel 114 may keep generating the second gamma reference voltage.

The first display panel 111 may amplify the first gamma reference voltage by a predetermined level when the first gamma reference voltage is less than the second gamma reference voltage and the difference between the first and second gamma reference voltages is in a range equal to or greater than the first reference value and smaller than a second reference value. In other words, the first display panel 111 may generate data signals based on the amplified gamma reference voltage. The second display panel 114 may keep generating the second gamma reference voltage.

The first display panel 111 may transmit difference data DF to the processor 120 when the first gamma reference voltage is higher than the second gamma reference voltage and the difference between the first and second gamma reference voltages is in the range equal to or greater than the first reference value and smaller than the second reference value. The processor 120 may transmit a drive control signal CTRL to the second display panel 114 on the basis of the difference data DF. The second display panel 114 may amplify the second gamma reference voltage by a predetermined level on the basis of the drive control signal CTRL. In other words, the second display panel 114 may generate data signals based on the amplified gamma reference voltage. The first display panel 111 may keep generating the first gamma reference voltage.

The first display panel 111 may transmit the difference data DF to the processor 120 when the difference between the first and second gamma reference voltages is equal to or greater than the second reference value. The second reference value may be greater than the first reference value. The processor 120 may perform control based on the difference data DF such that the first and second display panels 111 and 114 use the same gamma reference voltage. For example, when the first gamma reference voltage is higher than the second gamma reference voltage, the processor 120 may perform control such that the second display panel 114 uses the first gamma reference voltage, not the second gamma reference voltage. In other words, the processor 120 may transmit a drive control signal CTRL to the first and second display panels 111 and 114, and the first and second display panels 111 and 114 may change electrical wiring on the basis of the drive control signal CTRL by opening and closing internal switches, such that they share the first gamma reference voltage. The same description may be applied even when the second gamma reference voltage is higher than the first gamma reference voltage. In some implementations, the range for magnitude comparison with the difference between the first and second gamma reference voltages may include at least one of the first reference value and the second reference value, or may not include at least one of them. In other words, the range may be either a range equal to or greater than at least one of them, or a range equal to or smaller than at least one of them, or may be a range exceeding at least one of them or a range of smaller than at least one of them.

In some implementations, the first and second display panels 111 and 114 may be set so as to output the same gamma reference voltage, before emitting image light. In some implementations, the first and second display panels 111 and 114 may be set so as to output the same gamma reference voltage in real time while emitting image light.

As described above, the first and second display panels 111 and 114 may generate the same gamma reference voltage and output data signals having the same level, whereby the display device 110 may output images having the same luminance level corresponding to the same gray level to both eyes of a user, such that the user can view the images with high quality.

Images which are displayed on the first and second display panels 111 and 114 can be visually recognized by the eyes of the user through the optical system 117. In some implementations the optical system 117 may optically display image contents or magnify image light received from the first and second display panels 111 and 114, respectively, and correct optical errors associated with the image light, and provide the corrected image light to a user. For example, the optical system 117 may include a substrate, optical waveguides, apertures, Fresnel lenses, convex lenses, concave lenses, filters, input/output couplers, or other arbitrary suitable optical elements that may affect image light which is emitted from the first and second display panels 111 and 114.

The eye tracking sensor 118 may track the positions and movements of the eyes of a user. Eye tracking may refer to determining the positions of eyes, including the orientations and positions of the eyes, relative to the display device 110. In some implementations, the eye tracking sensor 118 may include an imaging system for imaging one or more eyes. In some implementations, the eye tracking sensor 118 may include a light emitter that generates light directed at eyes such that light reflected by the eyes can be captured by the imaging system. The eye tracking sensor 118 may transmit eye tracking data ED to the processor 120.

The processor 120 may be a computing device or system that externally controls the display device 110 such that images desired by a user are displayed on the pixel arrays 112 and 115. The processor 120 may transmit image data IS according to a content to be presented to a user, to the display device 110. In some implementations, the processor 120 may render a content generated during execution of an application, into image data IS containing a plurality of areas having different display qualities. For example, the image according to the image data IS may include a first area and a second area, and the first area may be rendered at a first quality (for example, high definition), and the second area around the first area may be rendered at a second quality (for example, low definition). The processor 120 may render image data IS on the basis of eye tracking data ED received from the display device 110. The processor 120 may receive eye tracking data ED from the eye tracking sensor 118, and determine the positions of the eyes of the user on the basis of the eye tracking data. For example, the processor may render a first area corresponding to the positions of the eyes of the user, at a first quality, and render a second area surrounding the first area, at a second quality.

The processor 120 may transmit a drive control signal CTRL to the display device 110. The drive control signal CTRL may contain control instructions, setting data, and the like to control the driver circuits 113 and 116 and the optical system 117. In some implementations, the drive control signal CTRL may contain an opening/closing instruction signal that instructs to open or close the switches in the first and second display panels 111 and 114. In some implementations, the drive control signal CTRL may contain a selection instruction signal that instructs multiplexers in the first and second display panels 111 and 114 to select any one gamma reference voltage. In some implementations, the drive control signal CTRL may contain an amplification instruction signal to instruct the first display panel 111 or the second display panel 114 to amplify a gamma reference voltage by a predetermined level. In some implementations, the drive control signal CTRL may contain area instruction data that instructs a plurality of areas of an image according to image data IS.

Further, the first and second display panels 111 and 114 according to some implementations may be implemented so as to be included not only in an artificial reality system such as the display system 10 but also in a tiled-display or the like in which a plurality of display panels operates as one display system.

Figure 2:
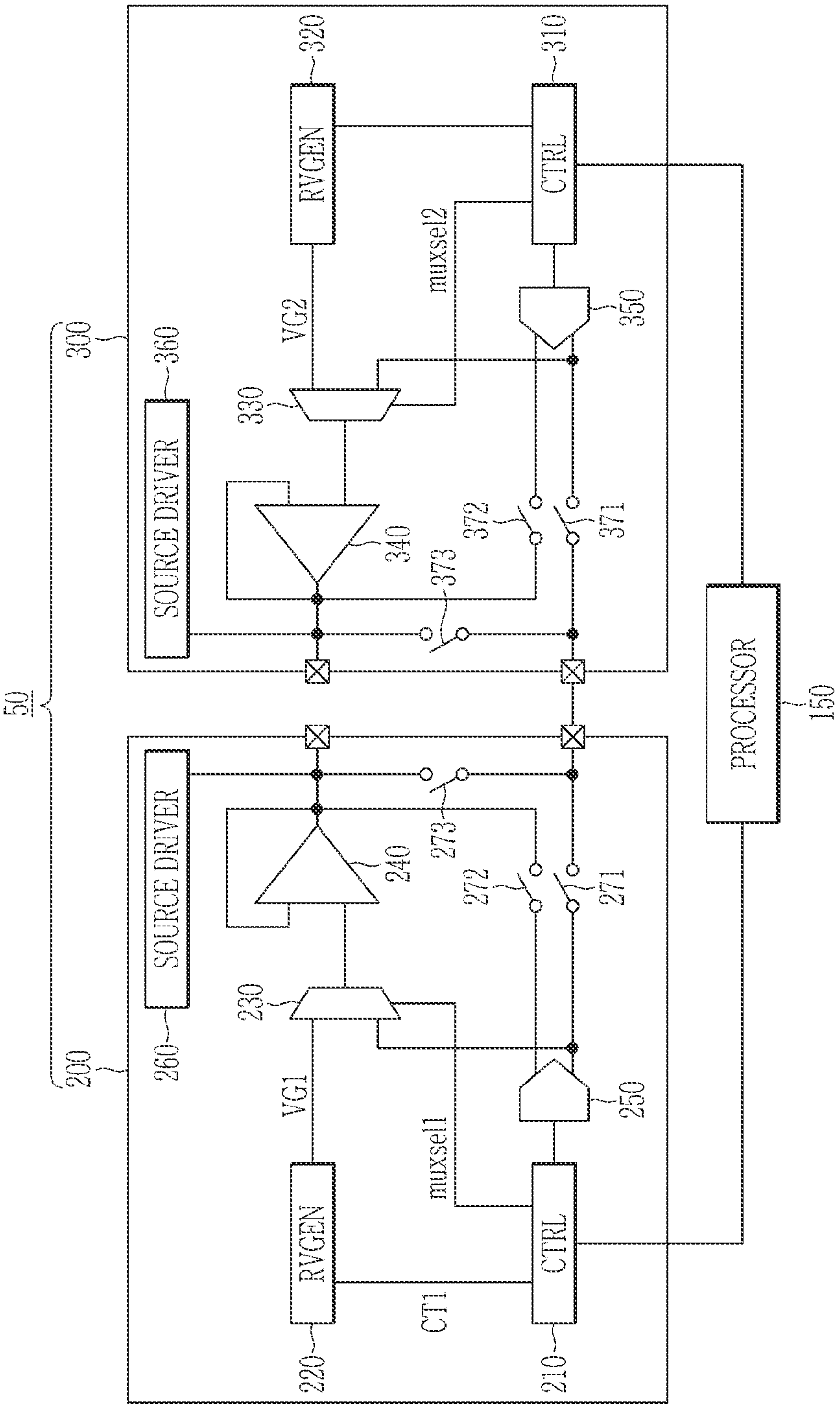
FIG. 2 is a circuit diagram for explaining the operation of a display device according to some implementations.

FIG. 2 is a circuit diagram for explaining the operation of a display device according to some implementations.

Referring to FIG. 2, a display device 50 according to some implementations includes a first driver circuit 200 and a second driver circuit 300. The display device 50 may emit image light under the control of the processor 150. In FIG. 2, for explaining the operation of the display device 50, only some constituent elements are shown, but the display device 50 may further include constituent elements for displaying images, such as a pixel array, a power source, etc.

The processor 150 may transmit first image data to the first driver circuit 200, and transmit second image data to the second driver circuit 300. The first driver circuit 200 may generate a first data signal for images to be displayed to the left eye of a user, on the basis of the first image data, and the second driver circuit 300 may generate a second data signal for images to be displayed to the right eye of the user, on the basis of the second image data.

The first driver circuit 200 may generate a first gamma reference voltage VG1, and generate a first data signal on the basis of the first gamma reference voltage VG1. The first driver circuit 200 includes a controller (CTRL) 210, a voltage generator (RVGEN) 220, a multiplexer (MUX) 230, a buffer 240, an analog-to-digital converter (ADC) 250, a source driver 260, and a plurality of switches 271 to 273. For example, the plurality of switches 271 to 273 may be transistors, and the processor 150 may apply an instruction signal to the gates of the transistors such that the plurality of switches 271 to 273 are turned on or off.

The voltage generator 220 may generate a first gamma reference voltage VG1. The voltage generator 220 may receive a drive voltage from the outside (for example, a power supply circuit), and generate a first gamma reference voltage VG1 based on the drive voltage. The voltage generator 220 may change the magnitude of the first gamma reference voltage VG1 on the basis of a control signal CT1 of the controller 210. In some implementations, the voltage generator 220 may output a control signal CT1 on the basis of data received from the analog-to-digital converter 250. In some implementations, the voltage generator 220 may output a control signal CT1 on the basis of a drive control signal received from the processor 150.

The multiplexer 230 may receive at least one of a first gamma reference voltage VG1 and a second gamma reference voltage VG2, and a selection signal muxsel1. For example, in a general situation or a normal situation, the controller 210 may output a selection signal muxsel1 at a first level, and the multiplexer 230 may receive the first gamma reference voltage VG1 and the first-level selection signal muxsel1. A normal situation may be understood as a situation where the difference between the first gamma reference voltage VG1 and the second gamma reference voltage VG2 is relatively small. The multiplexer 230 may transfer the first gamma reference voltage VG1 to the buffer 240 on the basis of the first-level selection signal muxsel1. In an abnormal situation, the controller 210 may output the selection signal muxsel1 at a second level, and the second driver circuit 300 may transfer the second gamma reference voltage VG2 to the multiplexer 230, and the multiplexer 230 may receive the first gamma reference voltage VG1, the second gamma reference voltage VG2, and the second-level selection signal muxsel1. The second level is a logic level different from the first level, and when the first level is a logic high level, the second level is a logic low level, and vice versa. An abnormal situation may be understood as a situation where the difference between the first gamma reference voltage VG1 and the second gamma reference voltage VG2 is relatively large. The processor 150 may close the switch 271 and a switch 373, whereby the second driver circuit 300 may transfer the second gamma reference voltage VG2 to the multiplexer 230 through the switch 271 and the switch 373. The multiplexer 230 may transfer the second gamma reference voltage VG2 to the buffer 240 in response to the second-level selection signal muxsel1.

The buffer 240 may output the first gamma reference voltage VG1 or the second gamma reference voltage VG2. In some implementations, the output voltage of the buffer 240 (for example, the first gamma reference voltage VG1 or the second gamma reference voltage VG2) may be input to the source driver 260. In some implementations, the output voltage of the buffer 240 (for example, the first gamma reference voltage VG1) may be input to the analog-to-digital converter 250 through the switch 272. In some implementations, the output voltage of the buffer 240 (for example, the second gamma reference voltage VG2) may be input to an analog-to-digital converter 350 of the second driver circuit 300 through the switch 273 and a switch 371. The switches 271 to 273 may be closed and opened in response to an opening/closing instruction signal of the processor 150. Transmission of an opening/closing instruction signal by the processor 150 may be understood as transmission of the opening/closing instruction signal at a high level. For example, the switches 271 to 273 may be closed in response to the opening/closing instruction signal at the high level, and may be opened in response to the opening/closing instruction signal at the low level.

The analog-to-digital converter 250 may receive the first gamma reference voltage VG1 and the second gamma reference voltage VG2. The analog-to-digital converter 250 may generate first and second sampling values by sampling the first and second gamma reference voltages VG1 and VG2, respectively. The analog-to-digital converter 250 may output the first and second sampling values to the controller 210.

The controller 210 may compare the first sampling value and the second sampling value. For example, the controller 210 may perform magnitude comparison on the first sampling value and the second sampling value. The controller 210 may compare the sampling values with reference values, and output different signals depending on the comparison results. The operation of the controller 210 will be described below with reference to FIG. 4 to FIG. 9.

The second driver circuit 300 may generate a second gamma reference voltage VG2, and generate a second data signal based on the second gamma reference voltage VG2. The second driver circuit 300 includes a controller 310, a voltage generator 320, a multiplexer 330, a buffer 340, the analog-to-digital converter 350, a source driver 360, and a plurality of switch 371 to 373. The controller 310, the voltage generator 320, the multiplexer 330, the buffer 340, the analog-to-digital converter 350, the source driver 360, and the plurality of switches 371 to 373 may be substantially similar in structure to the controller 210, the voltage generator 220, the multiplexer 230, the buffer 240, the analog-to-digital converter 250, the source driver 260, and the plurality of switches 271 to 273, respectively, and may perform operations similar to those of the constituent elements in the first driver circuit.

The driver circuit included in the master panel may compare the first and second gamma reference voltages VG1 and VG2. The driver circuit included in the slave panel may transfer its own gamma reference voltage to the driver circuit included in the master panel. For example, the first driver circuit 200 may be included in the master panel, and the second driver circuit 300 may be included in the slave panel. The second driver circuit 300 may transfer the second gamma reference voltage VG2 to the first driver circuit 200. The first driver circuit 200 may compare the first and second gamma reference voltages VG1 and VG2.

The processor 150 may monitor the gamma reference voltages, and designate the master panel and the slave panel on the basis of the gamma reference voltages. Before the processor 150 designates the master panel and the slave panel, any one display panel may be designated as the master panel in advance. For example, of the first and second display panels, the first display panel may be designated as the master panel in advance, and the processor 150 may change the master panel on the basis of the gamma reference voltages of the first and second display panels.

In some implementations, the processor 150 may receive data on the difference between the first gamma reference voltage and the second gamma reference voltage (reference symbol "DF" in FIG. 1) from the controller 210 of the display panel (for example, the display panel including the first driver circuit 200). In some implementations, the processor 150 may receive the first gamma reference voltage from the controller 210 of the display panel (for example, the display panel including the first driver circuit 200), receive the second gamma reference voltage from the controller 310 of the display panel (for example, the display panel including the second driver circuit 300), and compare the first gamma reference voltage and the second gamma reference voltage. When the second gamma reference voltage is higher than the first gamma reference voltage, the processor 150 may designate the display panel including the second driver circuit 300 as the master panel, and designate the display panel including the first driver circuit 200 as the slave panel. In some implementations, the processor 150 may monitor the gamma reference voltages when power is applied to the display device 50. In some implementations, the processor 150 may monitor the gamma reference voltages at regular monitoring intervals. For example, the processor 150 may monitor the gamma reference voltages during each vertical blanking period for a frame. In some implementations, the processor 150 may monitor the gamma reference voltages when an application or the like for generating image data IS to be provided to the display device 50 is changed. However, the period during which the processor 150 monitors the gamma reference voltages may be variously set, and is not limited to the above description.

In some implementations, the first and second driver circuits 200 and 300 may further include capacitors for stabilizing the first and second gamma reference voltages VG1 and VG2 output from the buffers 240 and 340, respectively. For example, the first driver circuit 200 may include a first capacitor for stabilizing the first gamma reference voltage VG1. The second driver circuit 300 may include a second capacitor for stabilizing the second gamma reference voltage VG2. The first and second capacitors may remove noise components from the first and second gamma reference voltages VG1 and VG2. In this case, the first and second capacitors may be disposed outside the first and second driver circuits 200 and 300. In other words, one end of each of the first and second capacitors may be coupled to a ground, and the other ends of them may be coupled to pads coupled to the buffers 240 and 340, respectively.

Figure 3:
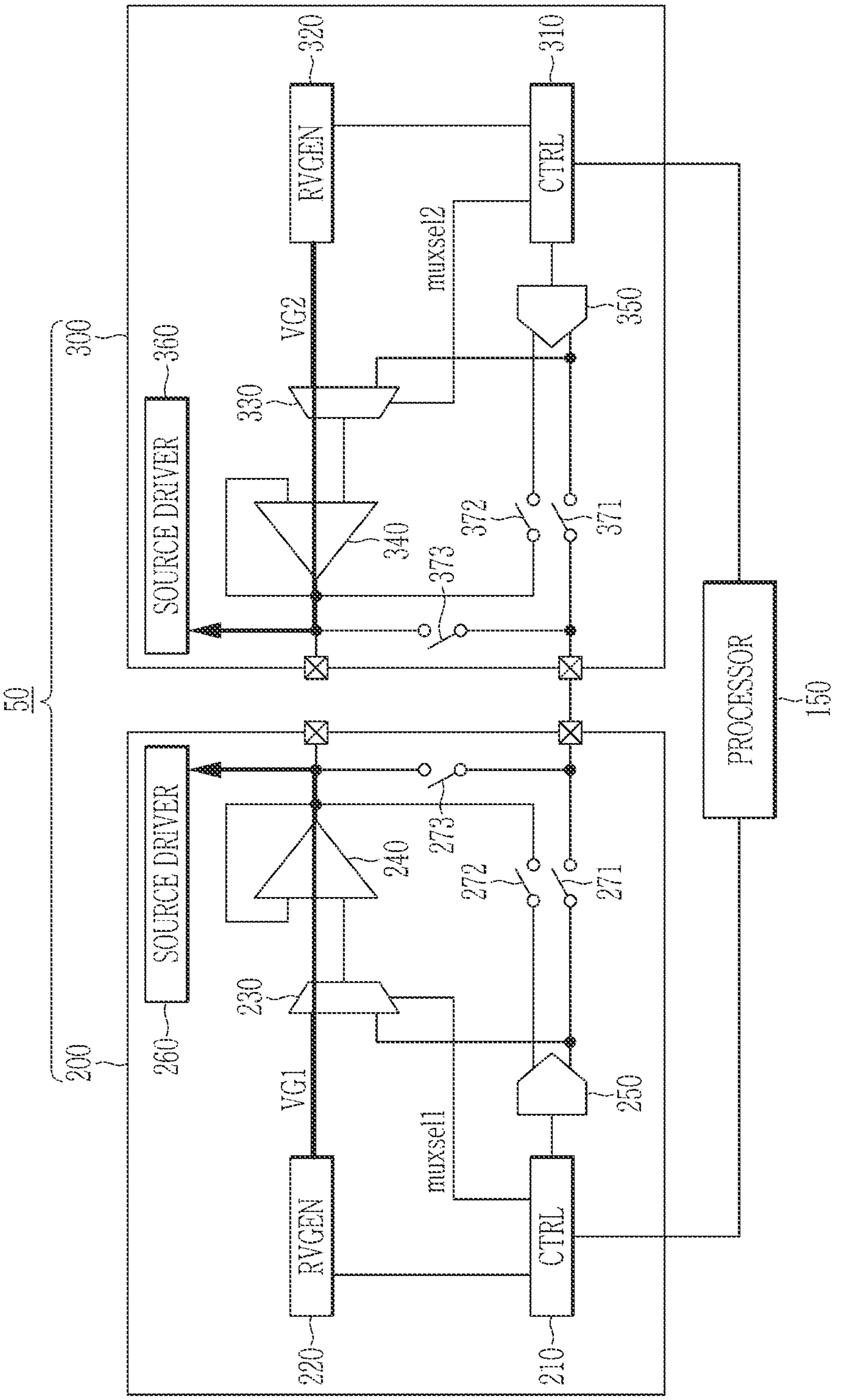
FIG. 3 is a circuit diagram for explaining the operation of the display device according to some implementations.

FIG. 3 is a circuit diagram for explaining the operation of the display device according to some implementations.

Referring to FIG. 3, the display device 50 according to some implementations may operate in a general situation or a normal situation. In the first driver circuit 200, the voltage generator 220 may generate a first gamma reference voltage VG1, and output it to the multiplexer 230. The controller 210 may output a first-level selection signal muxsel1 to the multiplexer 230. The multiplexer 230 may select a first gamma reference voltage VG1 based on the first-level selection signal muxsel1. The buffer 240 may output the first gamma reference voltage VG1. The source driver 260 may generate a plurality of gamma voltages on the basis of the first gamma reference voltage VG1. The source driver 260 may generate a first data signal on the basis of the plurality of gamma voltages, and output it to the first pixel array. The first pixel array may emit image light based on the first data signal from the source driver 260.

In the second driver circuit 300, the voltage generator 320 may generate a second gamma reference voltage VG2, and output it to the multiplexer 330. The controller 310 may output a selection signal muxsel2 at a first level to the multiplexer 330. The multiplexer 330 may select a second gamma reference voltage VG2 based on the first-level selection signal muxsel2. The buffer 340 may output the second gamma reference voltage VG2. The source driver 360 may generate a second data signal on the basis of the second gamma reference voltage VG2, and output it to the second pixel array. The second pixel array may emit image light based on the second data signal from the source driver 360. The user can view the image light emitted from the first and second pixel arrays.

Figure 4:
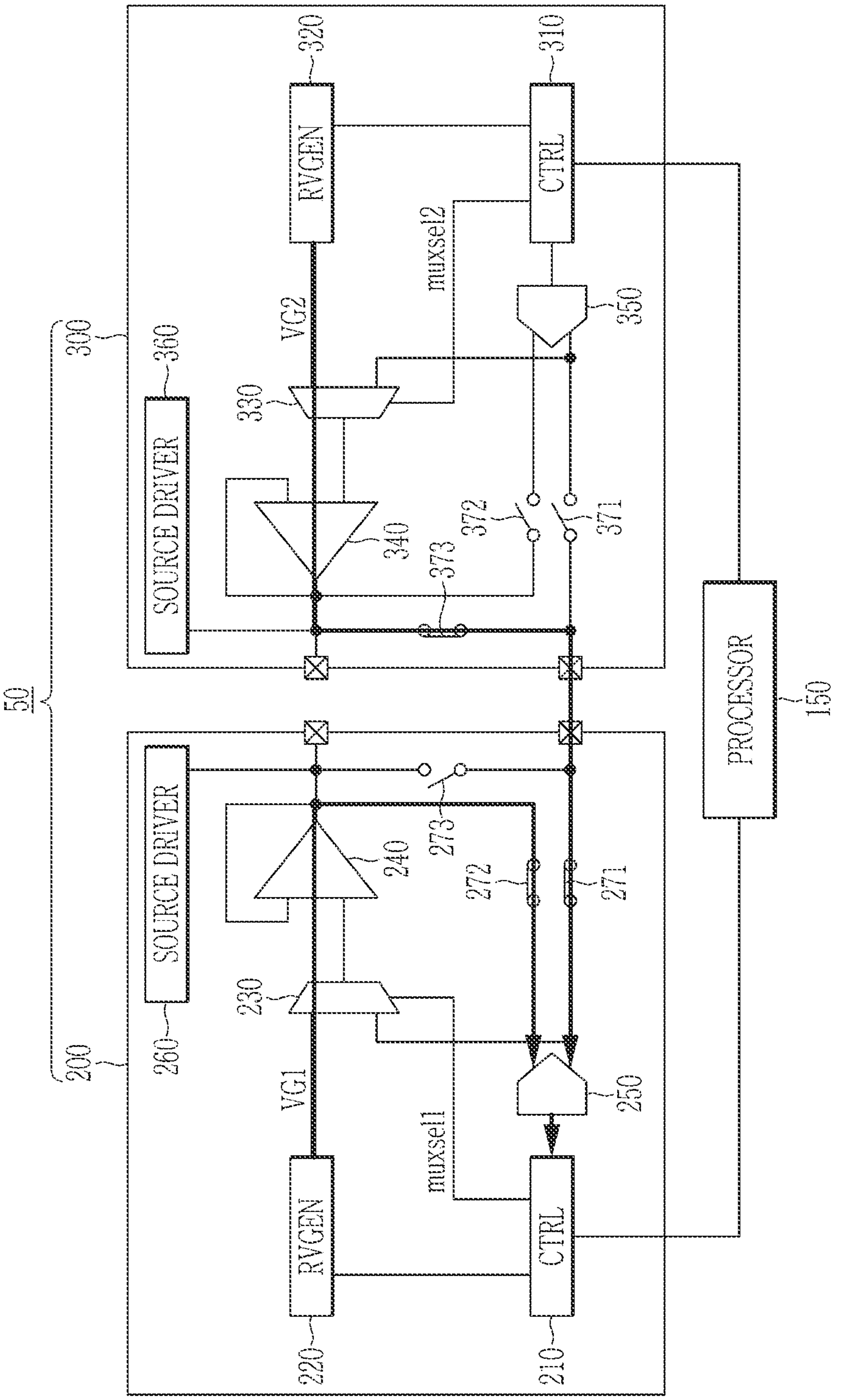
FIG. 4 is a circuit diagram for explaining the operation of the display device according to some implementations.

FIG. 4 is a circuit diagram for explaining the operation of the display device according to some implementations.

Referring to FIG. 4, the display device 50 according to some implementations may monitor the first and second gamma reference voltages VG1 and VG2 in a general situation and a normal situation. For example, the first driver circuit 200 included in the master panel may perform monitoring.

For monitoring, the processor 150 may transmit an opening/closing instruction signal to the switches 271, 272, and 373. The switches 271, 272, and 373 may be closed in response to an opening/closing instruction signal. In the first driver circuit 200, the voltage generator 220 may generate a first gamma reference voltage VG1, and output it to the multiplexer 230. The controller 210 may output a first-level selection signal muxsel1 to the multiplexer 230. The multiplexer 230 may select a first gamma reference voltage VG1 based on the first-level selection signal muxsel1. The buffer 240 may output the first gamma reference voltage VG1. The first gamma reference voltage VG1 may be input to the analog-to-digital converter 250 through the switch 272.

In the second driver circuit 300, the voltage generator 320 may generate a second gamma reference voltage VG2, and output it to the multiplexer 330. The controller 310 may output a first-level selection signal muxsel2 to the multiplexer 330. The multiplexer 330 may select a second gamma reference voltage VG2 based on the first-level selection signal muxsel2. The buffer 340 may output the second gamma reference voltage VG2. The second gamma reference voltage VG2 may be input to the analog-to-digital converter 250 through the switch 373 and the switch 271.

The analog-to-digital converter 250 may generate first and second sampling values by sampling the first and second gamma reference voltages VG1 and VG2. The analog-to-digital converter 250 may output the first and second sampling values to the controller 210. The controller 210 may determine the difference between the first and second gamma reference voltages VG1 and VG2 on the basis of the first and second sampling values.

It has been described with reference to FIG. 4 that the panel including the first driver circuit 200 is the master panel; however, implementations are not limited thereto, and the same description may also be applied to the case where the panel including the second driver circuit 300 is the master panel. In this case, the controller 310 may determine the difference between the first and second gamma reference voltages VG1 and VG2.

Figure 5:
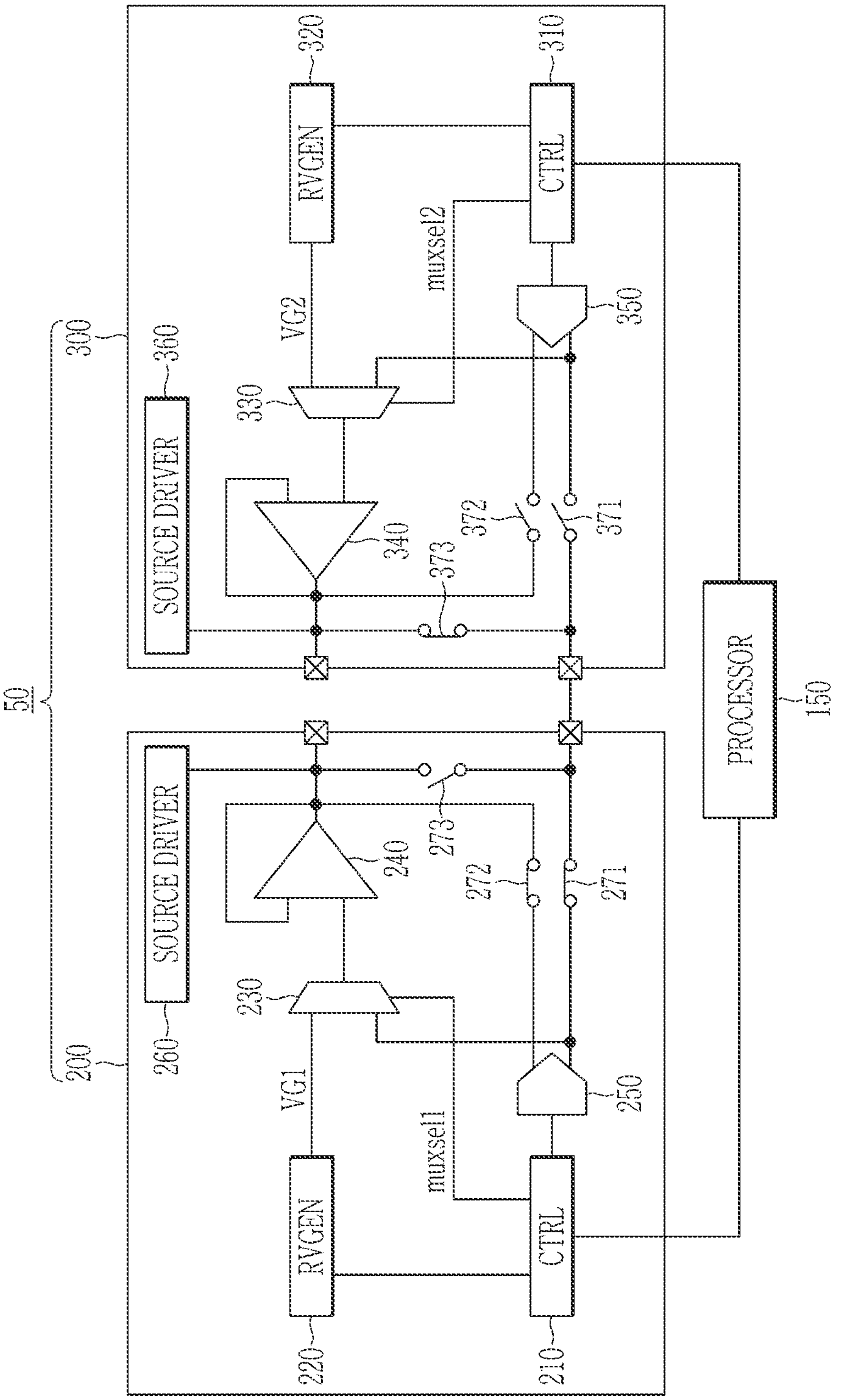
FIG. 5 is a circuit diagram for explaining the operation of the display device according to some implementations.

FIG. 5 is a circuit diagram for explaining the operation of the display device according to some implementations.

Referring to FIG. 5, the controller 210 according to some implementations may determine that the display device 50 is normally operating, when the first sampling value and the second sampling value are the same or the difference between the first and second sampling values is smaller than the first reference value. When the display device 50 is normally operating, the controller 210 may keep the current operation. In other words, the controller 210 may keep outputting the first-level selection signal muxsel1. The multiplexer 230 may select the first gamma reference voltage VG1 in response to the first-level selection signal muxsel1, and output it. The first gamma reference voltage VG1 may be input to the source driver 260 through the buffer 240 such that it is used to generate a first data signal.

Similarly, the controller 310 may keep the current operation to keep outputting the first-level selection signal muxsel2. Accordingly, the source driver 360 may keep generating a second data signal based on the second gamma reference voltage VG2. In this case, the switches 271, 272, and 373 may be closed in response to the opening/closing instruction signal from the processor 150, and the analog-to-digital converter 250 may keep sampling the first and second gamma reference voltages VG1 and VG2. The controller 210 may keep monitoring the first and second gamma reference voltages VG1 and VG2 on the basis of the first and second sampling values output from the analog-to-digital converter 250.

Figure 6:
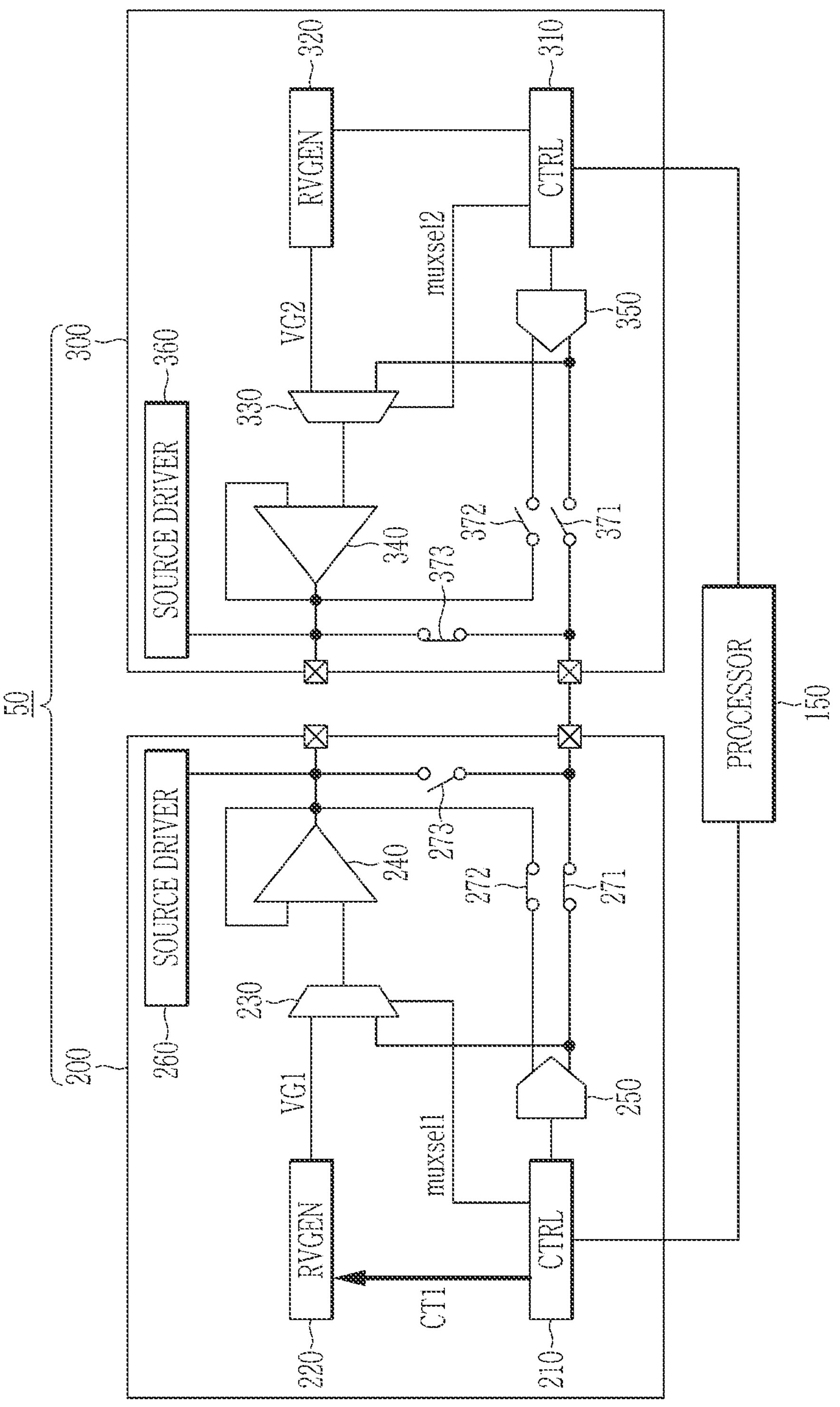
FIG. 6 is a circuit diagram for explaining the operation of the display device according to some implementations.

FIG. 6 is a circuit diagram for explaining the operation of the display device according to some implementations.

Referring to FIG. 6, the controller 210 according to some implementations may determine that the first sampling value is smaller than the second sampling value, on the basis of the first and second sampling values from the analog-to-digital converter 250. When the difference between the first and second sampling values is in a range equal to or greater than the first reference value and smaller than the second reference value (wherein the second reference value is greater than the first reference value), the controller 210 may output a control signal CT1 on the basis of the difference, and output the first-level selection signal muxsel1. The voltage generator 220 may amplify the first gamma reference voltage VG1 on the basis of the control signal CT1. The control signal CT1 may contain information on a degree of amplification. The multiplexer 230 may select the amplified first gamma reference voltage VG1 on the basis of the first-level selection signal muxsel1, and output it. The magnitude of the amplified first gamma reference voltage VG1 may be substantially the same as that of the second gamma reference voltage VG2.

In the second driver circuit 300, the controller 310 may keep the current operation to keep outputting the first-level selection signal muxsel2. Accordingly, the source driver 360 may keep generating a second data signal based on the second gamma reference voltage VG2. The first and second driver circuits 200 and 300 may generate data signals on the basis of gamma reference voltages having substantially the same magnitude, such that the user can view high-quality images.

In some implementations, the controller 210 may transmit information that the first gamma reference voltage VG1 is less than the second gamma reference voltage VG2, to the processor 150. Accordingly, the processor 150 may set the panel including the second driver circuit 300 as the master panel, and the controller 310 may monitor the first and second gamma reference voltages VG1 and VG2 on the basis of the sampling values which are output from the analog-to-digital converter 350. In this case, the processor 150 may close the switches 273, 371, and 372, and open the switches 271, 272, and 373.

Figure 7:
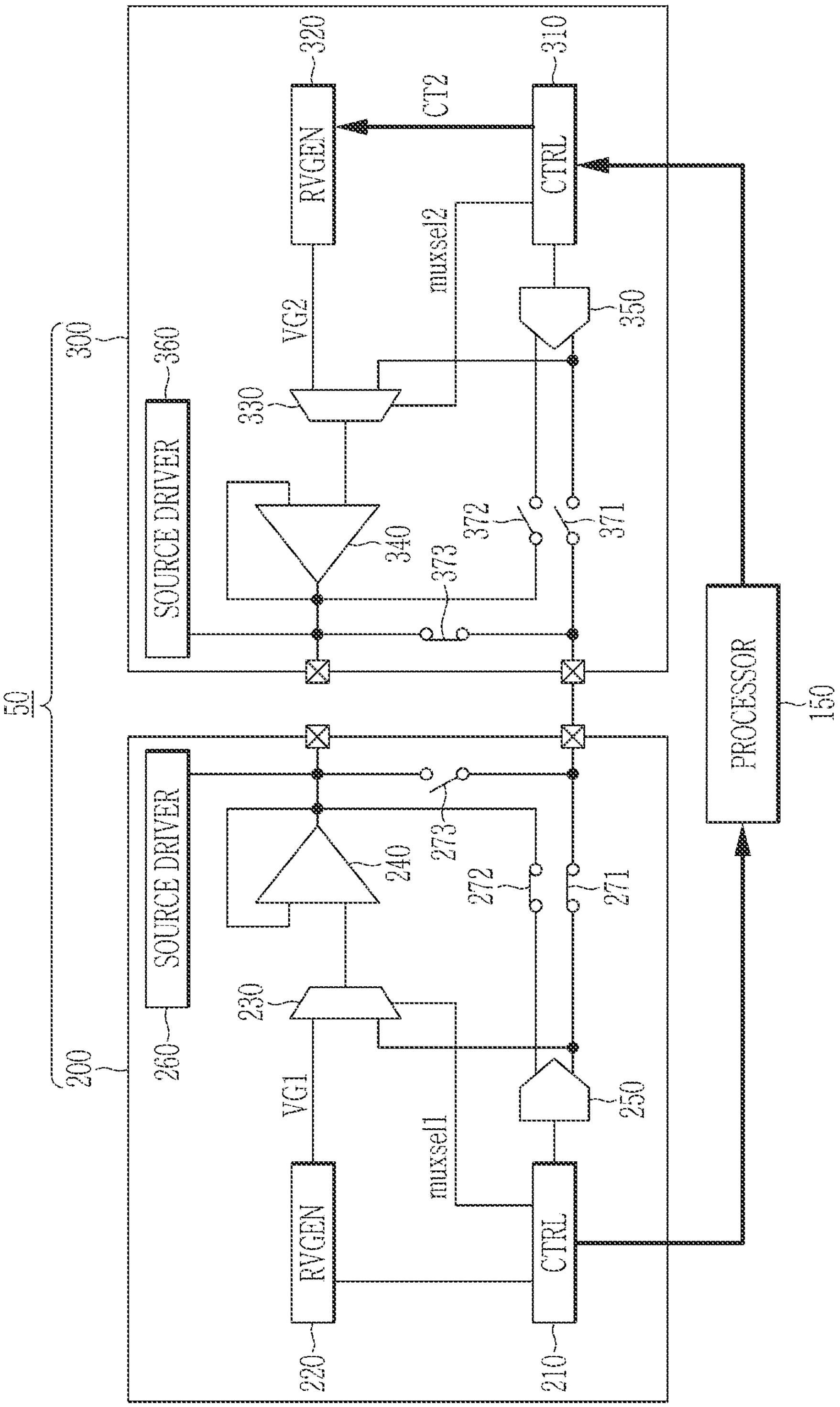
FIG. 7 is a circuit diagram for explaining the operation of the display device according to some implementations.

FIG. 7 is a circuit diagram for explaining the operation of the display device according to some implementations.

Referring to FIG. 7, the controller 210 according to some implementations may determine that the second sampling value is smaller than the first sampling value, on the basis of the first and second sampling values from the analog-to-digital converter 250. When the difference between the first and second sampling values is in a range equal to or greater than the first reference value and smaller than the second reference value (wherein the second reference value is greater than the first reference value), the controller 210 may transmit first difference data to the processor 150. The processor 150 may transmit an amplification insulation signal corresponding to the first difference data, to the controller 310 of the second driver circuit 300. The controller 310 may output a control signal CT2 on the basis of the amplification instruction signal, and output the first-level selection signal muxsel2. The voltage generator 320 may amplify the second gamma reference voltage VG2 on the basis of the control signal CT2. The control signal CT2 may contain information on a degree of amplification. The multiplexer 330 may select the amplified second gamma reference voltage VG2, on the basis of the first-level selection signal muxsel2. The buffer 340 may transfer the amplified second gamma reference voltage VG2 to the source driver 360. The source driver 360 may generate a data signal based on the amplified second gamma reference voltage VG2. The magnitude of the amplified second gamma reference voltage VG2 may be substantially the same as that of the first gamma reference voltage VG1.

In the first driver circuit 200, the controller 210 may output the first-level selection signal muxsel1 to the multiplexer 230. The multiplexer 230 may select the first gamma reference voltage VG1 on the basis of the first-level selection signal muxsel1 and output it. The first and second driver circuits 200 and 300 may generate data signals on the basis of gamma reference voltages having substantially the same magnitude, such that the user can view high-quality images.

Figure 8:
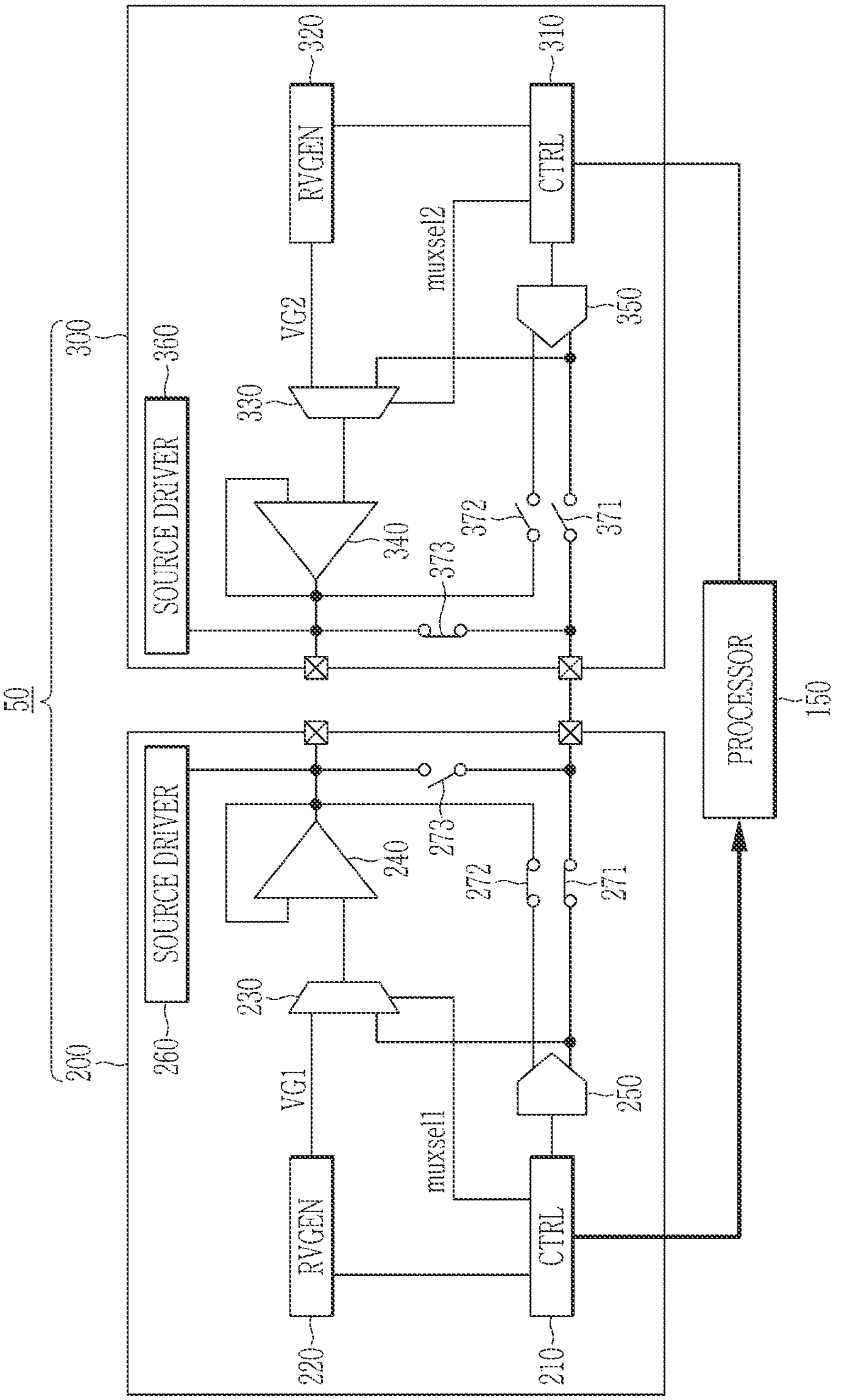
FIG. 8 is a circuit diagram for explaining the operation of the display device according to some implementations.
Figure 9:
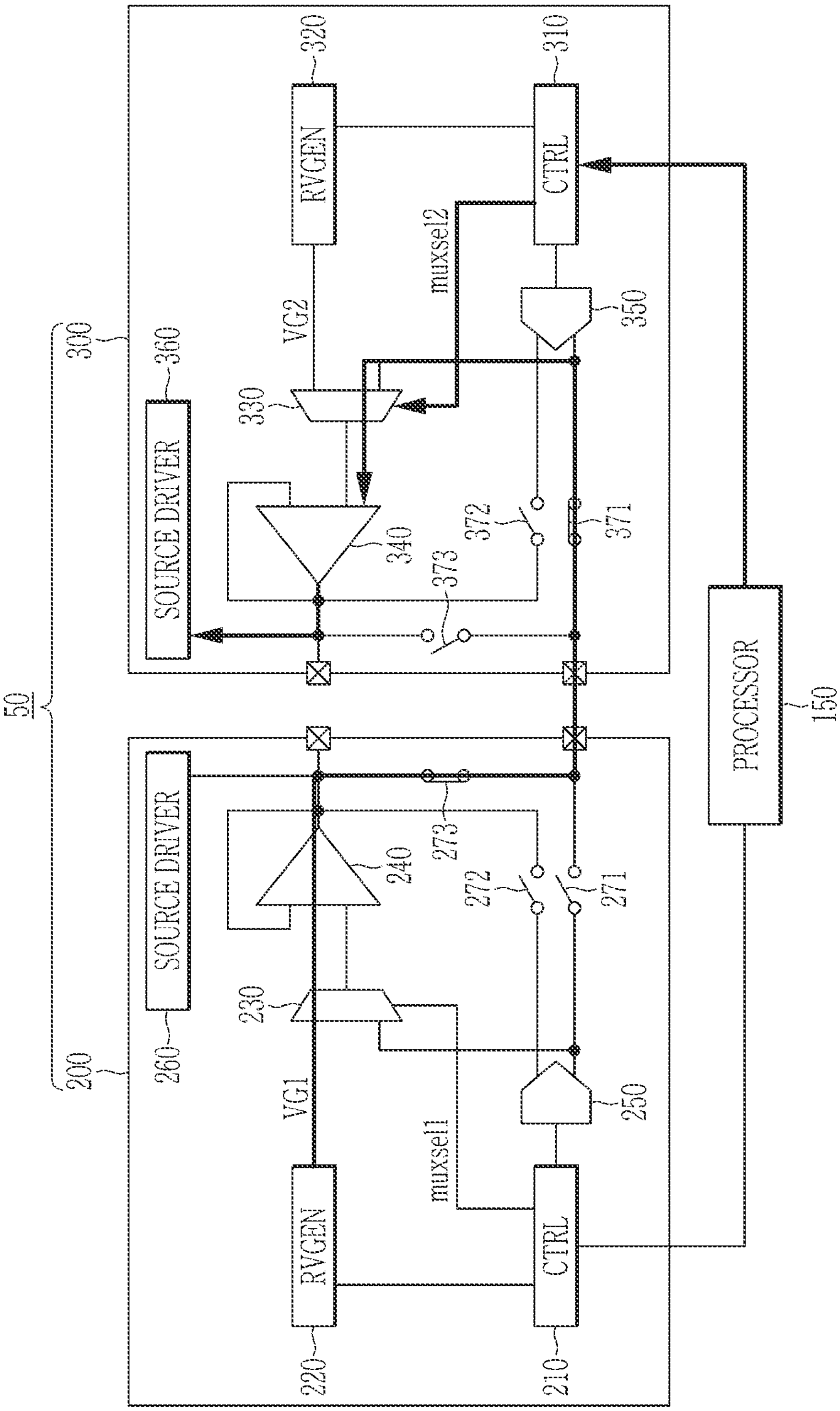
FIG. 9 is a circuit diagram for explaining the operation of the display device according to some implementations.

FIG. 8 and FIG. 9 are circuit diagrams for explaining the operation of the display device according to some implementations.

Referring to FIG. 8, the controller 210 according to some implementations may determine that the second sampling value is smaller than the first sampling value, on the basis of the first and second sampling values from the analog-to-digital converter 250. When the difference between the first and second sampling values is equal to or greater than the second reference value, the controller 210 may transmit second difference data corresponding to the difference, to the processor 150. The processor 150 may perform control based on the second difference data such that the first and second driver circuits 200 and 300 share a gamma reference voltage. For example, the processor 150 may transfer the first gamma reference voltage VG1 to the second driver circuit 300.

Referring to FIG. 9, the processor 150 according to some implementations may receive the second difference data from the controller 210. The processor 150 may generate an opening/closing instruction signal for opening or closing a plurality of switches 271 to 273 and 371 to 373, on the basis of the second difference data. For example, the processor 150 may transmit the opening/closing instruction signal to the switches 273 and 371, thereby closing the switches 273 and 371. The switches 271, 272, 372, and 373 that have not received the opening/closing instruction signal (or have received the opening/closing instruction signal at the low level) may be left open.

The voltage generator 220 may keep generating the first gamma reference voltage VG1, and the controller 210 may output the first-level selection signal muxsel1. The multiplexer 230 may transfer the first gamma reference voltage VG1 to the buffer 240 on the basis of the first-level selection signal muxsel1. Since the switch 271 is open, the multiplexer 230 may not receive the second gamma reference voltage VG2. The first gamma reference voltage VG1 passing through the buffer 240 may be transferred to the second driver circuit 300 through the switch 273.

In the second driver circuit 300, the first gamma reference voltage VG1 may be transferred to the multiplexer 330 through the switch 371.

The processor 150 may transmit a selection instruction signal to the controller 310 of the second driver circuit 300. The controller 310 may output the selection signal muxsel2 at a second level, on the basis of the selection instruction signal. In some implementations, the controller 310 may instruct the voltage generator 320 not to generate the second gamma reference voltage VG2.

The multiplexer 330 may select the first gamma reference voltage VG1 on the basis of the second-level selection signal muxsel2. The first gamma reference voltage VG1 output from the multiplexer 330 may be provided to the source driver 360 through the buffer 340. The source driver 360 may generate a second data signal based on the first gamma reference voltage VG1. As described above, both of the source driver 260 of the first driver circuit 200 and the source driver 360 of the second driver circuit 300 may generate data signals based on the first gamma reference voltage VG1. In other words, the display device 50 may perform control such that the first and second driver circuits 200 and 300 use the same gamma reference voltage even when a difference occurs between the first gamma reference voltage VG1 and the second gamma reference voltage VG2, thereby providing high-quality images to the user and improving the user's experience in artificial reality.

Figure 10:
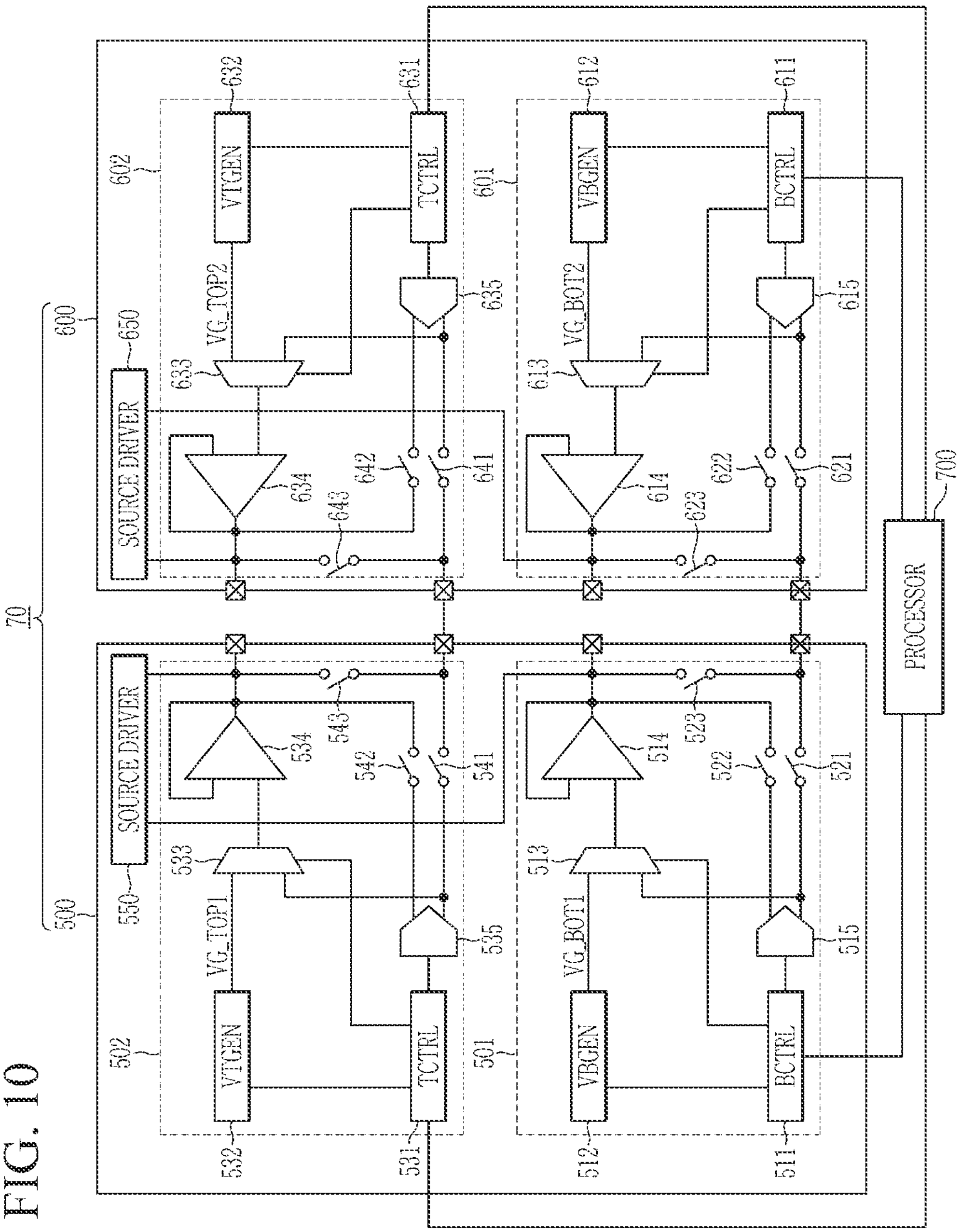
FIG. 10 is a circuit diagram for explaining the operation of a display device according to some implementations.

FIG. 10 is a circuit diagram for explaining the operation of a display device according to some implementations.

Referring to FIG. 10, a display device 70 according to some implementations includes a first driver circuit 500 that generates a first data signal and a second driver circuit 600 that generates a second data signal. The display device 70 may emit image light under the control of a processor 700.

The first driver circuit 500 may be included in a master panel, and the second driver circuit 600 may be included in a slave panel. The first driver circuit 500 which is included in the master panel may compare gamma voltages. For example, a first minimum gamma voltage generator 501 includes an analog-to-digital converter 515, which may receive a first minimum gamma voltage VG_BOT1 and a second minimum gamma voltage VG_BOT2. A first maximum gamma voltage generator 502 includes an analog-to-digital converter 535, which may receive a first maximum gamma voltage VG_TOP1 and a second maximum gamma voltage VG_TOP2. Controllers 511 and 531 may compare sampling values of the analog-to-digital converters 515 and 535, and operate according to the comparison result. For example, the controllers 511 and 531 may operate to minimize the difference between sampling values.

The processor 700 may change the master panel and the slave panel while the display device 70 is displaying images. For example, the processor 700 may compare gamma voltages output from the first and second driver circuits 500 and 600 (for example, the first and second minimum gamma voltages VG_BOT1 and VG_BOT2, and the first and second maximum gamma voltages VG_TOP1 and VG_TOP2), and designate a panel having a higher gamma voltage as the master panel, and designate a panel having a lower gamma voltage as the slave panel.

The first driver circuit 500 includes the first minimum gamma voltage generator 501, the first maximum gamma voltage generator 502, and a source driver 550. The first minimum gamma voltage generator 501 may generate a first minimum gamma voltage VG_BOT1. The first minimum gamma voltage generator 501 may output the first minimum gamma voltage VG_BOT1 to at least one of the source driver 550 and a second minimum gamma voltage generator 601. For example, in a normal situation, the first minimum gamma voltage generator 501 may output the first minimum gamma voltage VG_BOT1 to the source driver 550. In an abnormal situation, the first minimum gamma voltage generator 501 may output the first minimum gamma voltage VG_BOT1 to the source driver 550 and the second minimum gamma voltage generator 601, in response to an instruction from the processor 700.

The first minimum gamma voltage generator 501 includes the controller (BCTRL) 511, a voltage generator (VBGEN) 512, a multiplexer 513, a buffer 514, the analog-to-digital converter 515, and a plurality of switches 521 to 523. The contents related to the controller 210, the voltage generator 220, the multiplexer 230, the buffer 240, the analog-to-digital converter 250, and the plurality of switches 271 to 273 described with reference to FIG. 2 may be applied similarly to the controller 511, the voltage generator 512, the multiplexer 513, the buffer 514, the analog-to-digital converter 515, and the plurality of switches 521 to 523. Accordingly, a redundant description will not be made.

The first maximum gamma voltage generator 502 may generate a first maximum gamma voltage VG_TOP1. The first maximum gamma voltage VG_TOP1 may be higher than the first minimum gamma voltage VG_BOT1. The first maximum gamma voltage generator 502 includes the controller (TCTRL) 531, a voltage generator (VTGEN) 532, a multiplexer 533, a buffer 534, the analog-to-digital converter 535, and a plurality of switches 541 to 543. The contents related to the controller 210, the voltage generator 220, the multiplexer 230, the buffer 240, the analog-to-digital converter 250, and the plurality of switches 271 to 273 described with reference to FIG. 2 may be applied similarly to the controller (TCTRL) 531, the voltage generator (VTGEN) 532, the multiplexer 533, the buffer 534, the analog-to-digital converter 535, and the plurality of switches 541 to 543. Accordingly, a redundant description will not be made.

In a normal situation, the source driver 550 may generate a first data signal on the basis of the first minimum gamma voltage VG_BOT1 and the first maximum gamma voltage VG_TOP1. For example, the source driver 550 may include a gamma voltage generator which generates a plurality of gamma voltages on the basis of the first minimum gamma voltage VG_BOT1 and the first maximum gamma voltage VG_TOP1. The gamma voltage generator may include a resistor string, of whose both ends may receive the first minimum gamma voltage VG_BOT1 and the first maximum gamma voltage VG_TOP1. In a normal situation, the source driver 550 may generate a first data signal based on the plurality of gamma voltages.

In an abnormal situation, the source driver 550 may receive at least one of the second maximum gamma voltage VG_TOP2 and the second minimum gamma voltage VG_BOT2 from the second driver circuit 600. An abnormal situation may be understood as a situation in which the difference between gamma voltages is large. For example, the first minimum gamma voltage VG_BOT1 may need to be equal to or similar to the second minimum gamma voltage VG_BOT2, and the first maximum gamma voltage VG_TOP1 may need to be equal to or similar to the second maximum gamma voltage VG_TOP2. The case where such voltages are not equal to each other and the difference therebetween is large may be referred to as an abnormal situation.

When the first minimum gamma voltage VG_BOT1 is abnormal, the source driver 550 may receive the second minimum gamma voltage VG_BOT2 from the second driver circuit 600. When the first maximum gamma voltage VG_TOP1 is abnormal, the source driver 550 may receive the second maximum gamma voltage VG_TOP2 from the second driver circuit 600. When the first minimum gamma voltage VG_BOT1 and the first maximum gamma voltage VG_TOP1 are abnormal, the source driver 550 may receive the second minimum gamma voltage VG_BOT2 and the second maximum gamma voltage VG_TOP2 from the second driver circuit 600. In an abnormal situation, the processor 700 may change the electrical wiring of the first and second driver circuits 500 and 600 by opening or closing a plurality of switches 521 to 523, 541 to 543, 621 to 623, and 641 to 643. In an abnormal situation, the source driver 550 may generate a plurality of gamma voltages based on any one of the first minimum gamma voltage VG_BOT1 and the second minimum gamma voltage VG_BOT2 and any one of the first maximum gamma voltage VG_TOP1 and the second maximum gamma voltage VG_TOP2, and generate a first data signal based on the plurality of gamma voltages.

In some implementations, the controllers 511 and 531 may be integrated and operate as a single controller.

The second driver circuit 600 includes a sixth minimum gamma voltage generator 601, a second maximum gamma voltage generator 602, and a source driver 650. The sixth minimum gamma voltage generator 601, the second maximum gamma voltage generator 602, and the source driver 650 may be substantially similar to the first minimum gamma voltage generator 501, the first maximum gamma voltage generator 502, and the source driver 550, respectively in the first driver circuit 500. Accordingly, a redundant description will not be made.

In some implementations, each of the first and second driver circuits 500 and 600 may further include capacitors for stabilizing the gamma voltages VG_BOT1, VG_TOP1, VG_BOT2, and VG_TOP2 which are output from buffers 514, 534, 614, and 634. For example, the first driver circuit 500 may include a first capacitor for stabilizing the first minimum gamma voltage VG_BOT1 and a second capacitor for stabilizing the first maximum gamma voltage VG_TOP1. The second driver circuit 600 may include a third capacitor for stabilizing the second minimum gamma voltage VG_BOT2 and a fourth capacitor for stabilizing the second maximum gamma voltage VG_TOP2. The first to fourth capacitors may remove noise components from the gamma voltages VG_BOT1, VG_TOP1, VG_BOT2, and VG_TOP2. In this case, the first to fourth capacitors may be disposed outside the first and second driver circuits 500 and 600. In other words, one end of each of the first to fourth capacitors may be coupled to a ground, and the other ends of them may be coupled to pads coupled to the buffers 514, 534, 614, and 634.

Figure 11:
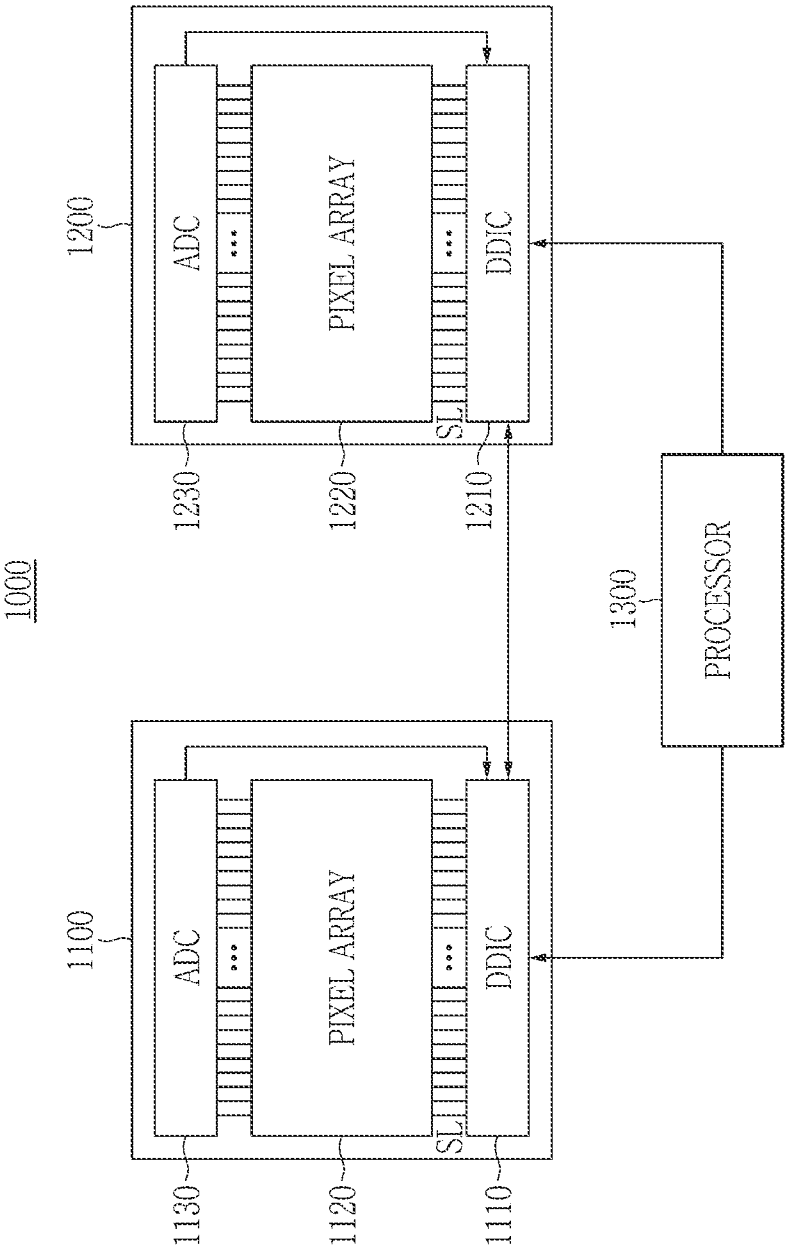
FIG. 11 is a block diagram for explaining the operation of a display device according to some implementations.

FIG. 11 is a block diagram for explaining the operation of a display device according to some implementations.

Referring to FIG. 11, a display device 1000 according to some implementations includes a first display panel 1100 and a second display panel 1200. The display device 1000 may emit image light under the control of a processor 1300.

The processor 1300 may control the overall operation of the display device 1000. The processor 1300 may perform control such that the display device 1000 emits first image light to one eye of a user and emits second image light to the other eye of the user. The processor 1300 may transmit first image data to the first display panel 1100 and transmit second image data to the second display panel 1200. In some implementations, the first image data and the second image data may be the same, or may be different. The first display panel 1100 may emit first image light based on the first image data, and the second display panel 1200 may emit second image light based on the second image data.

The processor 1300 may set the first display panel 1100 as the master panel, and set the second display panel 1200 as the slave panel. The master panel may receive a sampling value corresponding to the gamma voltage of the slave panel, from the slave panel, and compare a sampling value corresponding to its own gamma voltage with the sampling value of the slave panel. The master panel may operate to minimize the difference between the gamma voltages. The processor 1300 may monitor the gamma voltages (or sampling values) of the first and second display panels 1100 and 1200 while the display device 1000 is displaying images. When the gamma voltage of the first display panel 1100 gets lower than the gamma voltage of the second display panel 1200, the processor 1300 may set the second display panel 1200 as the master panel and set the first display panel 1100 as the slave panel.

The first display panel 1100 includes a display driver circuit (DDIC) 1110, a pixel array 1120, and an analog-to-digital converter (ADC) 1130. The display driver circuit 1110 may generate a first data signal, using a first gamma reference voltage, on the basis of the first image data received from the processor 1300.

The display driver circuit 1110 may transmit the first data signal to the pixel array 1120 through source lines SL. The pixel array 1120 may emit first image light based on the first data signal. The source lines SL may couple the display driver circuit 1110, the pixel array 1120, and the analog-to-digital converter 1130. In other words, the first data signal output from the display driver circuit 1110 may be used in the pixel array 1120 to emit first image light, and be input to the analog-to-digital converter 1130. The analog-to-digital converter 1130 may generate a first sampling value by sampling the input first data signal. The analog-to-digital converter 1130 may transmit the first sampling value to the display driver circuit 1110.

The second display panel 1200 includes a display driver circuit (DDIC) 1210, a pixel array 1220, and an analog-to-digital converter (ADC) 1230. As in the first display panel 1100, the display driver circuit 1210 may generate a second data signal, using a second gamma reference voltage, on the basis of the second image data, and transmit the second data signal to the pixel array 1220 and the analog-to-digital converter 1230 through the source lines SL. The analog-to-digital converter 1230 may generate a second sampling value by sampling the second data signal, and transmit the second sampling value to the display driver circuit 1210.

The processor 1300 may transmit the second sampling value of the second display panel 1200 which is the slave panel, to the display driver circuit 1110 of the first display panel 1100. For example, the processor 1300 may change electrical wiring by controlling opening and closing of switches of the display driver circuit 1210.

The display driver circuit 1110 of the first display panel 1100 may compare the first sampling value and the second sampling value. The display driver circuit 1110 may determine the difference between the first sampling value and the second sampling value. When the difference is smaller than a first reference value, the display driver circuit 1110 may keep the current operation. In other words, the display driver circuit 1110 may keep generating the first data signal using the first gamma reference voltage, and the pixel array 1120 may keep emitting first image light based on the first data signal. Similarly, the display driver circuit 1210 may keep generating the second data signal using the second gamma reference voltage, and the pixel array 1220 may keep emitting second image light based on the second data signal.

When the first sampling value is smaller than the second sampling value and the difference is equal to or greater than the first reference value and is smaller than a second reference value, the display driver circuit 1110 may amplify the first gamma reference voltage. The display driver circuit 1110 may generate a first data signal using the amplified first gamma reference voltage, and the pixel array 1120 may emit first image light based on the first data signal.

When the first sampling value is greater than the second sampling value and the difference is equal to or greater than the first reference value and is smaller than the second reference value, the display driver circuit 1110 may transmit the difference to the processor 1300. The processor 1300 may instruct the display driver circuit 1210 to amplify the second gamma reference voltage on the basis of the difference. The display driver circuit 1210 may generate a second data signal using the amplified second gamma reference voltage, and the pixel array 1220 may emit second image light based on the second data signal. In some implementations, the display driver circuit 1110 may transmit the difference to the display driver circuit 1210, and the display driver circuit 1210 may amplify the second gamma reference voltage on the basis of the difference.

When the second sampling value is greater than the first sampling value, and the difference is equal to or greater than the second reference value and is smaller than a third reference value, the display driver circuit 1110 may transmit the difference to the processor 1300. On the basis of the difference, the processor 1300 may instruct the display driver circuit 1210 to transfer the second gamma reference voltage to the display driver circuit 1110, and instruct the display driver circuit 1110 to use the second gamma reference voltage instead of the first gamma reference voltage. For example, the processor 1300 may control opening and closing of the switches of the display driver circuits 1110 and 1210 to transfer the second gamma reference voltage to the display driver circuit 1110. The processor 1300 may perform control such that the multiplexer of the display driver circuit 1110 selects the second gamma reference voltage instead of the first gamma reference voltage.

When the first sampling value is greater than the second sampling value, and the difference is equal to or greater than the second reference value and is smaller than the third reference value, the display driver circuit 1110 may transmit the difference to the processor 1300. On the basis of the difference, the processor 1300 may instruct the display driver circuit 1110 to transfer the first gamma reference voltage to the display driver circuit 1210, and instruct the display driver circuit 1210 to use the first gamma reference voltage instead of the second gamma reference voltage. For example, the processor 1300 may control opening and closing of the switches of the display driver circuits 1110 and 1210 to transfer the first gamma reference voltage to the display driver circuit 1210. The processor 1300 may perform control such that the multiplexer of the display driver circuit 1210 selects the first gamma reference voltage instead of the second gamma reference voltage.

As described above, the first and second display panels 1100 and 1200 may generate the same gamma reference voltage and output data signals having the same level, whereby the display device 1000 may output images having the same luminance level corresponding to the same gray level to both eyes of a user, such that the user can view the images with high quality.

Figure 12:
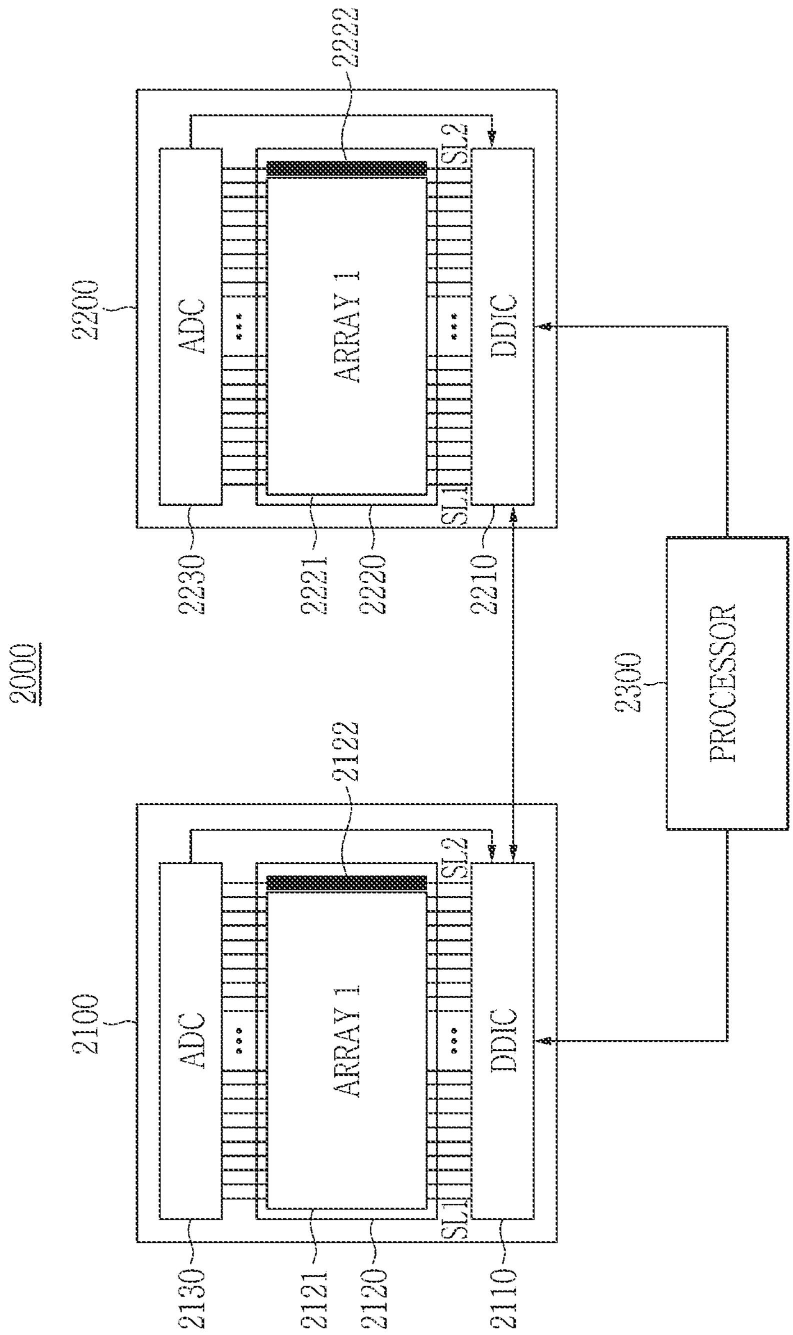
FIG. 12 is a block diagram for explaining the operation of a display device according to some implementations.

FIG. 12 is a block diagram for explaining the operation of a display device according to some implementations.

Referring to FIG. 12, a display device 2000 according to some implementations includes a first display panel 2100 and a second display panel 2200. The display device 2000 may emit image light under the control of a processor 2300.

The processor 2300 may control the overall operation of the display device 2000. The processor 2300 may perform control such that the display device 2000 emits first image light to one eye of a user and emits second image light to the other eye of the user. The processor 2300 may transmit first image data to the first display panel 2100 and transmit second image data to the second display panel 2200. In some implementations, the first image data and the second image data may be the same, or may be different. The first display panel 2100 may emit first image light based on the first image data, and the second display panel 2200 may emit second image light based on the second image data.

The processor 2300 may set the first display panel 2100 as the master panel, and set the second display panel 2200 as the slave panel. The master panel may receive a sampling value corresponding to the gamma voltage of the slave panel, from the slave panel, and compare a sampling value corresponding to its own gamma voltage with the sampling value of the slave panel. The master panel may operate to minimize the difference between the gamma voltages. The processor 2300 may monitor the gamma voltages (or sampling values) of the first and second display panels 2100 and 2200 while the display device 2000 is displaying images. When the gamma voltage of the first display panel 2100 gets lower than the gamma voltage of the second display panel 2200, the processor 2300 may set the second display panel 2200 as the master panel and set the first display panel 2100 as the slave panel.

The first display panel 2100 includes a display driver circuit (DDIC) 2110, a pixel array 2120, and an analog-to-digital converter (ADC) 2130. The display driver circuit 2110 may generate a first data signal and a dummy signal, using a first gamma reference voltage, on the basis of the first image data received from the processor 2300.

The display driver circuit 2110 may transmit the first data signal and the dummy signal to the pixel array 2120 through source lines. The pixel array 2120 includes a first pixel array (ARRAY1) 2121 and a second pixel array 2122. The first pixel array 2121 may emit first image light based on the first data signal. The second pixel array 2122 may be a dummy pixel array. For example, the second pixel array 2122 may emit black-level light based on the dummy signal. In some implementations, the second pixel array 2122 may be disposed at the edge of the first display panel 2100, or may be covered with a packaging element (for example, a bezel, etc.) from the user.

The source lines includes first source lines SL1 and second source lines SL2, and couple the display driver circuit 2110, the pixel array 2120, and the analog-to-digital converter 2130. The first pixel array 2121 may receive the first data signal through the first source lines SL1. The second pixel array 2122 may receive the dummy signal through the second source lines SL2. In other words, the first data signal output from the display driver circuit 2110 may be used in the first pixel array 2121 to emit first image light, and be input to the analog-to-digital converter 2130. The dummy signal output from the display driver circuit 2110 may be used in the second pixel array 2122 to emit black-level light, and be input to the analog-to-digital converter 2130.

The analog-to-digital converter 2130 may generate a first sampling value by sampling at least one of the first data signal and the dummy signal input thereto. In some implementations, the analog-to-digital converter 2130 may generate a first sampling value by sampling the dummy signal. The analog-to-digital converter 2130 may sample the dummy signal, thereby performing sampling in real time while the first pixel array 2121 is emitting the first image light. The analog-to-digital converter 2130 may transmit the first sampling value to the display driver circuit 2110.

The second display panel 2200 includes a display driver circuit (DDIC) 2210, a pixel array 2220, and an analog-to-digital converter (ADC) 2230. As in the first display panel 2100, the display driver circuit 2210 may generate a second data signal and a dummy signal, using a second gamma reference voltage, on the basis of the second image data, and transmit the second data signal to the pixel array 2220 and the analog-to-digital converter 2230 through first source lines SL1, and transmit the dummy signal to the pixel array 2220 and the analog-to-digital converter 2230 through second source lines SL2. The analog-to-digital converter 2230 may generate a second sampling value by sampling at least one of the second data signal and the dummy signal, and transmit the second sampling value to the display driver circuit 2210.

The processor 2300 may transmit the second sampling value of the second display panel 2200 which is the slave panel, to the display driver circuit 2110 of the first display panel 2100. For example, the processor 2300 may change electrical wiring by controlling opening and closing of switches of the display driver circuit 2210.

The display driver circuit 2110 of the first display panel 2100 may compare the first sampling value and the second sampling value. The display driver circuit 2110 may determine the difference between the first sampling value and the second sampling value. When the difference is smaller than a first reference value, the display driver circuit 2110 may keep the current operation. In other words, the display driver circuit 2110 may keep generating the first data signal and the dummy signal using the first gamma reference voltage, and the first pixel array 2121 may keep emitting first image light based on the first data signal. Similarly, the display driver circuit 2210 may keep generating the second data signal and the dummy signal using the second gamma reference voltage, and the second pixel array 2122 may keep emitting second image light based on the second data signal.

When the first sampling value is smaller than the second sampling value and the difference is equal to or greater than the first reference value and is smaller than a second reference value, the display driver circuit 2110 may amplify the first gamma reference voltage. The display driver circuit 2110 may generate a first data signal and a dummy signal using the amplified first gamma reference voltage, and the first pixel array 2121 may emit first image light based on the first data signal.

When the first sampling value is greater than the second sampling value and the difference is equal to or greater than the first reference value and is smaller than the second reference value, the display driver circuit 2110 may transmit the difference to the processor 2300. The processor 2300 may instruct the display driver circuit 2210 to amplify the second gamma reference voltage on the basis of the difference. The display driver circuit 2210 may generate a second data signal and a dummy signal using the amplified second gamma reference voltage, and the second pixel array 2122 may emit second image light based on the second data signal. In some implementations, the display driver circuit 2120 may transmit the difference to the display driver circuit 2210, and the display driver circuit 2210 may amplify the second gamma reference voltage on the basis of the difference.

When the second sampling value is greater than the first sampling value, and the difference is equal to or greater than the second reference value and is smaller than a third reference value, the display driver circuit 2110 may transmit the difference to the processor 2300. On the basis of the difference, the processor 2300 may instruct the display driver circuit 2210 to transfer the second gamma reference voltage to the display driver circuit 2110, and instruct the display driver circuit 2110 to use the second gamma reference voltage instead of the first gamma reference voltage. For example, the processor 2300 may control opening and closing of the switches of the display driver circuits 2110 and 2210 to transfer the second gamma reference voltage to the display driver circuit 2110. The processor 2300 may perform control such that the multiplexer of the display driver circuit 2110 selects the second gamma reference voltage instead of the first gamma reference voltage.

When the first sampling value is greater than the second sampling value, and the difference is equal to or greater than the second reference value and is smaller than the third reference value, the display driver circuit 2110 may transmit the difference to the processor 2300. On the basis of the difference, the processor 2300 may instruct the display driver circuit 2110 to transfer the first gamma reference voltage to the display driver circuit 2210, and instruct the display driver circuit 2210 to use the first gamma reference voltage instead of the second gamma reference voltage. For example, the processor 2300 may control opening and closing of the switches of the display driver circuits 2110 and 2210 to transfer the first gamma reference voltage to the display driver circuit 2210. The processor 2300 may perform control such that the multiplexer of the display driver circuit 2210 selects the first gamma reference voltage instead of the second gamma reference voltage.

As described above, the first and second display panels 2100 and 2200 may generate the same gamma reference voltage and output data signals having the same level, whereby the display device 2000 may output images having the same luminance level corresponding to the same gray level to both eyes of a user, such that the user can view the images with high quality.

Figure 13:
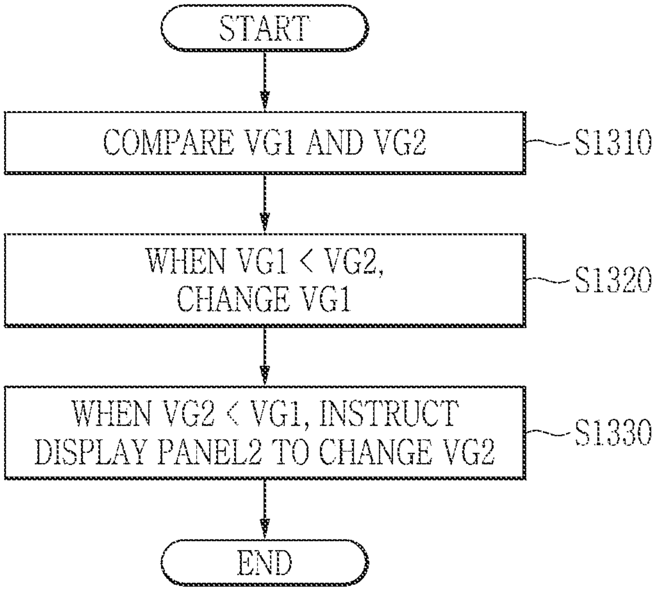
FIG. 13 is a flow chart of an image display method according to some implementations.

FIG. 13 is a flow chart of an image display method according to some implementations.

Referring to FIG. 13, a display device according to some implementations may include first and second display panels that emit first and second image light, respectively. The first display panel may emit first image light based on a first gamma reference voltage VG1, and the second display panel may emit second image light based on a second gamma reference voltage VG2. The first display panel may perform an image display method.

The first display panel may compare the first gamma reference voltage VG1 and the second gamma reference voltage VG2 (S1310). The first display panel may determine the voltage difference between the first gamma reference voltage VG1 and the second gamma reference voltage VG2. For example, the first display panel may obtain first and second sampling values by sampling the first gamma reference voltage VG1 and the second gamma reference voltage VG2 by an analog-to-digital converter, and compare the first and second sampling values. The first display panel may determine the difference between the first and second sampling values, as the voltage difference.

When the first gamma reference voltage VG1 is less than the second gamma reference voltage VG2, the first display panel may change the first gamma reference voltage VG1 (S1320). When the first sampling value is smaller than the second sampling value, the first display panel may determine that the first gamma reference voltage VG1 is less than the second gamma reference voltage VG2.

In some implementations, when the first gamma reference voltage VG1 is less than the second gamma reference voltage VG2, and the voltage difference between the first gamma reference voltage VG1 and the second gamma reference voltage VG2 is equal to or greater than a first reference value and is smaller than a second reference value, the first display panel may amplify the first gamma reference voltage VG1. Here, the second reference value may be greater than the first reference value. The voltage difference between the first gamma reference voltage VG1 and the second gamma reference voltage VG2 may correspond to the difference between the first sampling value and the second sampling value. Further, when the first gamma reference voltage VG1 is less than the second gamma reference voltage VG2, and the voltage difference is equal to or greater than the second reference value, the first display panel may use the second gamma reference voltage VG2, instead of the first gamma reference voltage VG1, to emit first image light.

When the second gamma reference voltage VG2 is less than the first gamma reference voltage VG1, the first display panel may instruct the second display panel to change the second gamma reference voltage VG2 (S1330). When the second sampling value is smaller than the first sampling value, the first display panel may determine that the second gamma reference voltage VG2 is less than the first gamma reference voltage VG1.

In some implementations, when the second gamma reference voltage VG2 is less than the first gamma reference voltage VG1, and the voltage difference between the first gamma reference voltage VG1 and the second gamma reference voltage VG2 is equal to or greater than the first reference value and is smaller than the second reference value, the first display panel may output a first signal to instruct the second display panel to amplify the second gamma reference voltage VG2.

Further, when the second gamma reference voltage VG2 is less than the first gamma reference voltage VG1, and the voltage difference is equal to or greater than the second reference value, the first display panel may output a second signal to instruct the second display panel to use the first gamma reference voltage VG1 instead of the second gamma reference voltage VG2.

In some implementations, the first display panel may transmit at least one of the first signal and the second signal to the second display panel. In some implementations, the first display panel may transmit at least one of the first signal and the second signal to a processor that manages the first display panel and the second display panel. The processor may control the second display panel on the basis of at least one of the first signal and the second signal. The second display panel may amplify the second gamma reference voltage VG2 or may use the first gamma reference voltage VG1, on the basis of at least one of the first signal and the second signal or under the control of the processor.

As described above, the first and second display panels of the display device emit image light using gamma reference voltages having the same magnitude, such that a user using the display device can view images having the same quality. Therefore, the user's experience can be improved.

In some implementations, each of the components described with reference to FIG. 1 to FIG. 13, or a combination of two or more components may be implemented as a digital circuit, a programmable or non-programmable logic device or array, an application specific integrated circuit (ASIC), etc.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a combination can in some cases be excised from the combination, and the combination may be directed to a subcombination or variation of a subcombination.

While this invention has been described in connection with what is presently considered to be practical implementations, it is to be understood that the invention is not limited to the disclosed implementations. On the contrary, it is intended to cover various modifications and equivalent arrangements included within the spirit and scope of the appended claims.

What is claimed is:

1. A display device comprising:

a first display driver circuit configured to output a first gamma reference voltage to a first display panel; and a second display driver circuit configured to output a second gamma reference voltage to a second display panel physically separated from the first display panel and to determine a difference between the first gamma reference voltage and the second gamma reference voltage, wherein the first display panel is configured to emit first image light for a first eye of a user, and the second display panel is configured to emit second image light for a second eye of the user, wherein the second display driver circuit is configured to output the second gamma reference voltage when the difference is smaller than a first reference value, change the second gamma reference voltage when the second gamma reference voltage is less than the first gamma reference voltage and the difference is equal to or greater than the first reference value, and instruct the first display driver circuit to change the first gamma reference voltage output by the first display driver circuit to the first display panel when the first gamma reference voltage output by the first display driver circuit to the first display panel is less than the second gamma reference voltage output by the second display driver circuit to the second display panel.

2. The display device of claim 1, wherein the second display driver circuit includes:

an analog-to-digital converter configured to generate a first sampling value and a second sampling value by performing sampling on the first gamma reference voltage and the second gamma reference voltage; and a controller configured to determine the difference by comparing the first sampling value and the second sampling value.

3. The display device of claim 1, further comprising:

a processor configured to transmit first image data to the first display driver circuit and transmit second image data to the second display driver circuit, wherein the first display driver circuit is configured to generate a first data signal based on the first image data, using the first gamma reference voltage and output the first data signal to source lines of the first display panel, and the second display driver circuit is configured to generate a second data signal based on the second image data, using the second gamma reference voltage, and output the second data signal to the source lines of the second display panel.

4. The display device of claim 3, wherein when the difference is equal to or greater than a second reference value, the second display driver circuit is configured to transmit the difference to the processor, and the processor is configured to control opening and closing of switches of the first display driver circuit and switches of the second display driver circuit, on the basis of the difference, and the second reference value is greater than the first reference value.

5. The display device of claim 4, wherein when the first gamma reference voltage is less than the second gamma reference voltage, the processor is configured to control opening and closing of the switches of the first display driver circuit and the switches of the second display driver circuit to transfer the second gamma reference voltage to the first display driver circuit, and when the second gamma reference voltage is less than the first gamma reference voltage, the processor is configured to control opening and closing of the switches of the first display driver circuit and the switches of the second display driver circuit to transfer the first gamma reference voltage to the second display driver circuit.

6. The display device of claim 1, wherein when the second gamma reference voltage is less than the first gamma reference voltage and the difference is equal to or greater than the first reference value, the second display driver circuit is configured to amplify the second gamma reference voltage on the basis of the difference.

7. The display device of claim 1, wherein when the second gamma reference voltage is less than the first gamma reference voltage and the difference is equal to or greater than a second reference value, the second display driver circuit is configured to receive the first gamma reference voltage from the first display driver circuit and output the first gamma reference voltage instead of the second gamma reference voltage, and the second reference value is greater than the first reference value.

8. The display device of claim 7, wherein the second display driver circuit includes a multiplexer configured to receive the first gamma reference voltage and the second gamma reference voltage and output the first gamma reference voltage in response to a selection signal.

9. The display device of claim 1, wherein when the first gamma reference voltage is less than the second gamma reference voltage and the difference is equal to or greater than the first reference value, the second display driver circuit is configured to output the difference such that the first display driver circuit amplifies the first gamma reference voltage on the basis of the difference.

10. The display device of claim 1, wherein when the first gamma reference voltage is less than the second gamma reference voltage and the difference is equal to or greater than a second reference value, the second display driver circuit is configured to output the second gamma reference voltage to the first display driver circuit, and the second reference value is greater than the first reference value.

11. A display device comprising:

a first display panel configured to emit first image light for a first eye of a user based on first image data, using a first gamma reference voltage;

a second display panel configured to emit second image light for a second eye of the user based on second image data, using a second gamma reference voltage, the second display panel physically separated from the first display panel; and a processor configured to generate the first image data and the second image data and control the first gamma reference voltage of the first display panel or the second gamma reference voltage of the second display panel, on the basis of a difference between the first gamma reference voltage and the second gamma reference voltage, wherein the first display panel is configured to instruct the second display panel to change the second gamma reference voltage used by the second display panel when the second gamma reference voltage used by the second display panel is less than the first gamma reference voltage used by the first display panel, or wherein the second display panel is configured to instruct the first display panel to change the first gamma reference voltage used by the first display panel when the first gamma reference voltage used by the first display panel is less than the second gamma reference voltage used by the second display panel.

12. The display device of claim 11, wherein
one of the first display panel and the second display panel is a master panel,
the master panel is configured to determine the difference between the first gamma reference voltage and the second gamma reference voltage and transmit the difference to the processor.

13. The display device of claim 12, wherein
when the first gamma reference voltage is higher than the second gamma reference voltage, the processor is configured to set the first display panel as the master panel and set the second display panel as a slave panel, and
when the first gamma reference voltage is less than the second gamma reference voltage, the processor is configured to set the second display panel as the master panel and set the first display panel as the slave panel.

14. The display device of claim 11, wherein
the first display panel includes:
a pixel array configured to emit the first image light based on a first data signal;
an analog-to-digital converter configured to generate a first sampling value by sampling the first data signal; and
a display driver circuit configured to generate the first data signal based on the first image data, using the first gamma reference voltage, receive the first sampling value from the analog-to-digital converter, receive a second sampling value from the second display panel, and determine a difference between the first sampling value and the second sampling value as the difference between the first gamma reference voltage and the second gamma reference voltage.

15. The display device of claim 14, wherein
the display driver circuit, the pixel array, and the analog-to-digital converter are coupled through a plurality of source lines, and
the analog-to-digital converter is configured to receive the first data signal from the pixel array through the plurality of source lines.

16. The display device of claim 14, wherein
the pixel array includes a dummy array configured to emit black-level light based on a dummy signal,
the analog-to-digital converter is configured to generate a first dummy value by sampling the dummy signal, and
the display driver circuit is configured to generate the dummy signal using the first gamma reference voltage, receive the first dummy value from the analog-to-digital converter, receive a second dummy value from the second display panel, determine the difference between the first dummy value and the second dummy value as the difference between the first gamma reference voltage and the second gamma reference voltage.

17. The display device of claim 11, wherein
when the first gamma reference voltage is less than the second gamma reference voltage, the processor is configured to perform control such that the first display panel uses the second gamma reference voltage and perform control such that the second display panel transfers the second gamma reference voltage to the first display panel, and
when the second gamma reference voltage is less than the first gamma reference voltage, the processor is configured to perform control such that the second display panel uses the first gamma reference voltage and perform control such that the first display panel transfers the first gamma reference voltage to the second display panel.

18. An image display method comprising:
comparing, by a first display panel, a first gamma reference voltage that is used in the first display panel with a second gamma reference voltage that is used in a second display panel physically separated from the first display panel, wherein the first display panel emits first image light for a first eye of a user, and the second display panel emits second image light for a second eye of the user;
changing, by the first display panel, the first gamma reference voltage used in the first display panel when the first gamma reference voltage used in the first display panel is less than the second gamma reference voltage used in the second display panel; and
instructing, by the first display panel, the second display panel to change the second gamma reference voltage used in the second display panel when the second gamma reference voltage used in the second display panel is less than the first gamma reference voltage used in the first display panel.

19. The image display method according to claim 18,
wherein changing the first gamma reference voltage includes:
amplifying the first gamma reference voltage, when the first gamma reference voltage is less than the second gamma reference voltage and a voltage difference between the first gamma reference voltage and the second gamma reference voltage is equal to or greater than a first reference value and is smaller than a second reference value; and
emitting, by the first display panel, image light using the second gamma reference voltage instead of the first gamma reference voltage when the first gamma reference voltage is less than the second gamma reference voltage and the voltage difference is equal to or greater than the second reference value, and
wherein the second reference value is greater than the first reference value.

20. The image display method according to claim 18,
wherein instructing the second display panel includes:
outputting a first signal such that the second display panel amplifies the second gamma reference voltage when the second gamma reference voltage is less than the first gamma reference voltage and a voltage difference between the first gamma reference voltage and the second gamma reference voltage is equal to or greater than a first reference value and is smaller than a second reference value; and
outputting a second signal such that the second display panel uses the first gamma reference voltage instead of the second gamma reference voltage when the second gamma reference voltage is less than the first gamma reference voltage and the voltage difference is equal to or greater than the second reference value, and
wherein the second reference value is greater than the first reference value.

* * * * *